US008859681B2

(12) United States Patent
Colhoun et al.

(10) Patent No.: US 8,859,681 B2
(45) Date of Patent: Oct. 14, 2014

(54) POLYESTER BLENDS EXHIBITING LOW TEMPERATURE TOUGHNESS

(75) Inventors: Frederick Leslie Colhoun, Kingsport, TN (US); Mark Edward Stewart, Kingsport, TN (US); Stephen Weinhold, Kingsport, TN (US); Richard Dalton Peters, Kingsport, TN (US); Roger Lee Martin, Gray, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 0 days.

(21) Appl. No.: 13/222,798

(22) Filed: Aug. 31, 2011

(65) Prior Publication Data

US 2011/0318519 A1 Dec. 29, 2011

Related U.S. Application Data

(62) Division of application No. 11/809,761, filed on Jun. 1, 2007, now Pat. No. 8,058,360.

(51) Int. Cl.

| B32B 1/08 | (2006.01) |
|---|---|
| B21B 3/00 | (2006.01) |
| B29C 41/42 | (2006.01) |
| C08L 67/03 | (2006.01) |
| C08L 67/02 | (2006.01) |
| B29C 51/00 | (2006.01) |
| C08J 5/18 | (2006.01) |
| C08L 23/06 | (2006.01) |
| C08K 3/36 | (2006.01) |
| C08L 77/00 | (2006.01) |
| C08K 3/04 | (2006.01) |
| C08L 23/08 | (2006.01) |
| B29C 51/10 | (2006.01) |
| B29K 67/00 | (2006.01) |

(52) U.S. Cl.
CPC ............... B29C 51/002 (2013.01); *C08L 23/06* (2013.01); *C08K 3/36* (2013.01); *C08L 77/00* (2013.01); *C08K 3/04* (2013.01); C08L 67/02 (2013.01); *C08L 23/08* (2013.01); *B29C 51/10* (2013.01); *C08J 2367/02* (2013.01); *B29K 2995/0041* (2013.01); C08J 5/18 (2013.01); *B29K 2067/00* (2013.01)
USPC ........................................................ 525/132

(58) Field of Classification Search
USPC ........................................................ 525/132
See application file for complete search history.

(56) References Cited

U.S. PATENT DOCUMENTS

| 3,496,143 A | 2/1970 | Siggel et al. |
|---|---|---|
| 4,088,709 A | 5/1978 | Seymour et al. |
| 4,172,859 A * | 10/1979 | Epstein .......................... 428/402 |
| 4,284,540 A | 8/1981 | Iida et al. |
| 4,753,980 A | 6/1988 | Deyrup |
| 5,068,283 A | 11/1991 | Ohmae et al. |
| 5,086,116 A | 2/1992 | Ohmae et al. |
| 5,086,118 A | 2/1992 | Ohmae et al. |
| 5,086,119 A | 2/1992 | Ohmae et al. |
| 5,098,953 A | 3/1992 | Ohmae et al. |
| 5,206,291 A | 4/1993 | Stewart |
| 5,208,292 A | 5/1993 | Hert et al. |
| 5,296,550 A | 3/1994 | Natarajan et al. |
| 5,407,999 A | 4/1995 | Hert et al. |
| 5,436,296 A | 7/1995 | Swamikannu et al. |
| 5,483,001 A | 1/1996 | Hert |
| 5,652,306 A | 7/1997 | Meyer et al. |
| 6,020,414 A | 2/2000 | Nelsen et al. |
| 6,156,867 A | 12/2000 | Aoyama et al. |
| 6,159,406 A * | 12/2000 | Shelby et al. ............ 264/211.12 |
| 6,197,851 B1 | 3/2001 | Maxwell et al. |
| 6,576,309 B2 | 6/2003 | Dalgewicz et al. |
| 6,953,768 B2 | 10/2005 | Wallace et al. |
| 6,986,864 B2 | 1/2006 | Porter |
| 7,015,261 B1 | 3/2006 | Zerafati et al. |
| 7,015,267 B2 | 3/2006 | Cartier et al. |
| 7,119,152 B1 | 10/2006 | Lacroix et al. |
| 7,132,383 B2 | 11/2006 | Nakajima et al. |
| 7,153,811 B2 | 12/2006 | Wallace et al. |
| 7,521,523 B2 | 4/2009 | Jenkins et al. |

(Continued)

FOREIGN PATENT DOCUMENTS

| CN | 1182101 A | 5/1998 |
|---|---|---|
| CN | 1454930 A | 11/2003 |

(Continued)

OTHER PUBLICATIONS

Office Action issued Nov. 27, 2009 in Mexican Patent Application No. MX/a/2009/012859.

(Continued)

*Primary Examiner* — Mike M Dollinger
(74) *Attorney, Agent, or Firm* — Oblon, Spivak, McClelland, Maier & Neustadt, L.L.P.

(57) ABSTRACT

Polymer blends suitable for packaging are disclosed that include one or more impact modifiers; and one or more polyethylene terephthalate homopolymers or copolymers obtained by a melt phase polymerization using a catalyst system comprising aluminum atoms in an amount, for example, from about 3 ppm to about 60 ppm and one or more alkaline earth metal atoms, alkali metal atoms, or alkali compound residues in an amount, for example, from about 1 ppm to about 25 ppm, in each case based on the weight of the one or more polyethylene terephthalate homopolymers or copolymers The polymer blends disclosed exhibit improved low temperature toughness compared with blends made using polymers prepared with conventional catalyst systems.

32 Claims, No Drawings

(56) References Cited

U.S. PATENT DOCUMENTS

| | | | |
|---|---|---|---|
| 2003/0045673 A1 | 3/2003 | Nakajima et al. | |
| 2005/0014929 A1 | 1/2005 | Rule | |
| 2005/0182233 A1* | 8/2005 | Weinhold et al. | 528/272 |
| 2005/0222345 A1 | 10/2005 | Nakayama et al. | |
| 2005/0261463 A1 | 11/2005 | Trexler et al. | |
| 2006/0276587 A1 | 12/2006 | Hong et al. | |
| 2007/0066735 A1 | 3/2007 | Quillen et al. | |
| 2007/0066791 A1 | 3/2007 | Jernigan et al. | |
| 2008/0161465 A1 | 7/2008 | Jenkins et al. | |
| 2008/0161529 A1 | 7/2008 | Jenkins et al. | |
| 2008/0255280 A1 | 10/2008 | Sims et al. | |

FOREIGN PATENT DOCUMENTS

| | | |
|---|---|---|
| EP | 0 481 471 | 4/1992 |
| EP | 0 737 715 | 10/1996 |
| JP | 62-146950 | 3/1987 |
| JP | 62-146949 | 6/1987 |
| WO | 00/15716 | 3/2000 |
| WO | 00/15717 | 3/2000 |
| WO | 00/23520 | 4/2000 |

OTHER PUBLICATIONS

Chinese Office Action issued Sep. 6, 2011, in Patent Application No. 200880018504.9 (English-language translation only).
European Office Action issued Jul. 5, 2011, in Patent Application No. 08 767 824.9, filed May 20, 2008.
International Search Report for PCT/US2008/006446 dated Feb. 19, 2009 (corresponding PCT application).
F. W. Billmeyer, Jr., "Method for Estimating Intrinsic Viscosity", Journal of Polymer Science, vol. 4, pp. 83-86, E.I. du POnt de Nemours & Co., Arlington, New Jersey. (1949).
M. Hert, "Though thermoplastic polyesters by reactive extrusion with epoxy-containing copolymers", Die Angewandte Makromolekulare Chemie, 1996, pp. 89-99. (1992).
Penco, et al. "High-Impact Poly (ethylene terephthalate) Blends", Journal of Applied Polymer Science, vol. 57, pp. 329-334. (1995).
D. W. van Krevelen, "Crystallinity of Polymers and the Means to Influence the Crystallization Process", Chimia, vol. 32, p. 279. (1978).
Rubber Toughened Engineering Plastics, A.A. Collyer, Chapman & Hall, London, pp. 136-164. (1994).
J. Schiers, "Additives for the Modification of Poly(Ethylene Terephthalate) to Produce Engineering-Grade Polymers in Modern Polyesters", Sheirs, J. and Long, T.E. (Eds.), Wiley, pp. 506-515. (New York 2003).
M. E. Stewart, "Effect of Catalyst on the Reactive Processing of Polyester with Epoxy-Functional Polymers", Polymer Engineering and Science, vol. 33, No. 11, p. 675. (1993).
Office Action issued Jun. 20, 2012, in Chinese Patent Application No. 200880018504.9 (submitting English translation only).
European Search Report issued Oct. 9, 2012 in connection with corresponding European Application No. 08 767 824.9, filed May 20, 2008.
European Office Action issued Oct. 10, 2013 in connection with corresponding European Patent Application No. 08 767 824, filed May 20, 2008.
Chinese Office Action Issued Jan. 16, 2013 in Patent Application No. 200880018504.9 (with English translation).

* cited by examiner

POLYESTER BLENDS EXHIBITING LOW TEMPERATURE TOUGHNESS

The present application is a Divisional application of 11/809,761, now allowed.

FIELD OF THE INVENTION

This invention pertains to polymer blends which are particularly useful for shaping or forming into containers and similar shaped articles by thermoforming procedures. More specifically, the novel polymer blends comprise a one or more thermoplastic polyester homopolymers or copolymers, an impact modifier, and a nucleator to enhance the crystallization rate of the polymer blend. The polymer blends exhibit improved impact strength, particularly at low temperatures and are suitable for food trays (containers) which may be subjected to low temperatures (refrigeration).

BACKGROUND OF THE INVENTION

Polyesters such as poly(ethylene terephthalate) (PET) are engineering thermoplastics used in a wide variety of end use applications such as fibers, films, automotive parts, food and beverage containers and the like. PET can be processed by a variety of techniques including injection molding, compression molding, extrusion, thermoforming, blow molding, and combinations thereof. Extruded into film (a.k.a., sheet) of between 100 and 1000 microns thick, PET may be used as-fabricated or shaped, e.g., by thermoforming, into articles such as displays, signs, credit or debit cards, or packaging articles. For example, extruded PET film material can be used to make trays, packages or containers in which frozen foods can be both stored and heated and/or cooked in an oven. As used herein, the terms tray or trays are intended to include packages and containers in which food, especially frozen food, is packaged and sold for subsequent heating and/or cooking while still in the tray, package or container. Food trays fabricated from crystallized PET retain good dimensional stability over the range of temperatures commonly encountered during both microwave and convection oven cooking.

One problem encountered with PET food trays is that they occasionally break when trays containing frozen food are dropped. One way to improve the low temperature toughness of the trays, as measured by lowering the ductile-to-brittle transition temperature, is to use high molecular weight PET in the fabrication of the tray. Therefore, PET used in food trays often is specially manufactured to an intrinsic viscosity (It.V.) of about 0.90 to about 1.05 dL/g. Another approach is to add an impact modifier to the PET during the film extrusion process. In general, trays are toughest when both approaches are utilized.

U.S. Pat. No. 4,172,859 discloses that polymeric materials that serve well as impact modifiers should (i) possess a modulus ⅒ that of the polyester matrix material, (ii) be well dispersed within the matrix material in discrete phases of 0.01 micron to 3.0 micron in size, and (iii) be well bonded to the matrix.

Low modulus polymers commonly used as impact modifiers fall into several general classes. The first class comprises rubbers based on butadiene or isoprene, e.g., polybutadiene, polyisoprene, natural rubber, styrene-butadiene (SBR), acrylonytrile-butadiene (ABN or nitrile rubber), styrene-butadiene-styrene (SBS) or hydrogenated SBS, styrene-ethylene-butene-styrene) block copolymers (SEBS), or acrylonytrile-butadiene-styrene (ABS) polymers containing high levels of butadiene. Butadiene-based rubbers generally have low glass transition temperatures ($T_g$'s) which help to improve low temperature toughness, but they may not be stable under the high temperatures at which polyesters are processed. The second major class of impact modifiers comprise elastomers based on polyethylene, e.g., ethylene-propylene rubbers (EPR) or EPRs with a small amount of side chain diene moiety (EPDM), ethylene-acrylate copolymers such as ethylene/methyl acrylate, ethylene/ethyl acrylate, ethylene/butyl acrylate and ethylene/methylacrylate/glycidyl methacrylate, or ethylene-vinyl acetate copolymers (EVA). A third group of impact modifiers consists of core-shell impact modifiers such as those that contain a poly(methyl methacrylate) (PMMA) hard shell with either a butadiene methacrylate-butadiene-styrene (MBS) or butyl acrylate (acrylic) core, e.g., PARALOID manufactured by Rohm & Haas Company. Core-shell impact modifiers based on acrylonitrile-butadiene-styrene (ABS) also are commercially available, e.g., BLENDEX manufactured by GE Specialty Chemicals). Other elastomers that may serve as impact modifiers include polyesters, e.g., HYTREL manufactured, by E.I. duPont de Nemours Company and ECDEL manufactured by Eastman Chemical Company, and polyurethanes, e.g., PELLETHANE manufactured by Dow Chemical Company, or silicone rubbers.

By properly matching the melt viscosities of the matrix and impact modifier at the temperatures of melt blending, a fine discrete impact modifier phase can be created by the shearing forces obtained during melt processing. A mixing screw must be designed properly to create the appropriate shear fields during a compounding/extrusion process. However, impact modifiers dispersed by purely mechanical action may re-coalesce during a later stage of processing where shear may be reduced.

Alternatively, impact modifiers can be manufactured to an inherently small size using latex or other polymerization processes. Impact modifiers manufactured in this way often contain a stiff shell of harder polymer and are, therefore, often referred to as core-shell impact modifiers. These impact modifiers can be made in 0.2-0.5 micron sizes ideally suited for impact modification of nylons, polycarbonates and polyesters. Nonetheless, these core-shell impact modifiers also must be dispersed by shearing action during melt processing, and are prone to re-coalesce during later stages of molding or compounding.

One way to enhance dispersion and prevent coalescence is to introduce functional groups into the impact modifier that either are highly soluble in the matrix polymer or will react with the matrix polymer. Interaction between these functional groups and the matrix during compounding creates a thin interlayer of material that makes the impact modifier and matrix more energetically compatible. Compatibility related to these functional groups leads to good mixing and good dispersion of the impact modifier. The enhanced compatibility also will reduce the possibility that the impact modifier phases will re-coalesce later during processing. Therefore, impact modifiers containing functional groups that react rapidly with the matrix polymer produce well-dispersed impact modifier phases of small particle size (See "Rubber Toughened Engineering Plastics", A.A. Collyer, Chapman & Hall, London, 1994). The incorporation of functional groups into the impact modifier also will ensure a good bond between the impact modifier and matrix, i.e. interfacial adhesion between these immiscible phases.

Impact modifiers can be functionalized with a variety of reactive or non-reactive monomers. These functional monomers can be incorporated into the impact modifier directly during preparation of the impact modifier or subsequently by means of a grafting polymerization step. Non-reactive impact modifiers (for example an EPDM-grafted-SAN) compatibilize themselves to the matrix through a closer matching of solubility parameters, without actually bonding to the matrix polymer. The reactive groups of reactive impact modifiers chemically bond to the matrix polymer but, to be effective, they must do so in the limited time available in the extruder during compounding (i.e., during melt blending).

U.S. Pat. No. 4,172,859 lists a variety of functional groups that may be grafted or copolymerized onto ethylene-based elastomers for use with polyesters and nylons. In practice, maleic anhydride (MAH) functionalized impact modifiers work well for nylons, and there are many commercial products available, e.g., EPR-MAH, EVA-MAH, and SEBS-MAH. However, the reaction between maleic anhydride and polyesters is not fast enough for significant compatibilization in the timescales encountered during normal compounding. A functional group that reacts particularly well with polyesters is the monosubstituted oxirane, or epoxy, group such as is present in glycidyl methacrylate (GMA), glycidyl acrylate, allyl glycidyl ether, and 3,4-epoxy-1-butene (EpB). This patent describes thermoplastic compositions comprising blends of polyesters and epoxy-functionalized random ethylene copolymers.

The following patent documents describe polyester compositions which contain epoxy-containing, ethylene-based polymeric materials (also see Scheirs, J., Additives for the Modification of Poly(Ethylene Terephthalate) to Produce Engineering-Grade Polymers in Modern polyesters, Scheirs, J. and Long, T. E. (Eds), Wiley, N.Y., 2003, pp. 506-515)). U.S. Pat. No. 4,172,859 describes thermoplastic compositions comprising blends of polyesters and epoxy-functionalized, random ethylene copolymers. This patent makes no reference to catalyst residues present in the polyesters. U.S. Pat. No. 4,284,540 describes the use of ethylene/GMA copolymers as a toughening agent for polyesters when combined with 0.1 to 5 weight percent of an added barium catalyst. This patent notes that PET containing antimony catalyst residues are preferable for promoting a reaction with epoxy-containing olefinic materials. The patent does not, however, provide any data that show any toughness enhancement due to these catalyst residues. U.S. Pat. No. 4,753,980 discloses that polyester compositions containing 3-40 weight percent of either ethylene/ethyl acrylate/GMA terpolymer or ethylene/butyl acrylate/GMA terpolymer possess superior low temperature toughness when compared to analogous polyester compositions which contain an ethylene/methyl acrylate/GMA terpolymer. There is no reference to catalyst residues in this patent. U.S. Pat. No. 6,576,309 discloses a polymeric composition comprising a poly(alkylene terephthalate), 4 wt % to 40 wt % ethylene/methyl acrylate copolymer, and 0.1 wt % to 8 wt % of a compatibilizing olefin/acrylate/GMA terpolymer, however the patent makes no reference to the catalyst residues present. U.S. Pat. Nos. 5,098,953, 5,086,119, 5,086,118, 5,086,116, and 5,068,283 disclose that the toughness of polyester compositions containing ethylene/GMA copolymers or ethylene/alkyl acrylate/GMA terpolymers can be improved by adding a functional crosslinking agent to the compositions. The functional crosslinking agent contains, in one molecule, at least two functional groups having reactivity with epoxy group, carboxyl group or hydroxyl group.

US Appln 20060276587 discloses core-shell impact modifier used in performance polymers (e.g., polyesters) to improve low temperature impact performance. In a preferred embodiment, the shell is polymethylmethacrylate or a copolymer containing at least 85 percent by weight of methylmethacrylate. For modification of polyesters, polyamide or alike, small amounts of reactive functionality are typically incorporated in the shell stage. Such reactive monomer can be glycidyl (meth)acrylate, (meth)acrylic amide, (meth)acrylic acid, maleic anhydride and alike.

U.S. Pat. No. 5,206,291 describes compositions comprising a polyester containing 1,4-cyclohexanedimethanol residues and an ethylene/GMA copolymer. Stewart et al., Polymer Engineering and Science, 33 (11), 675 (1993), discloses that PET containing antimony catalyst residues reacts faster with an ethylene/GMA copolymer than does PET catalyzed by other metals. U.S. Pat. No. 5,436,296 discloses that an ethylene/GMA copolymer may be used to compatibilize blends of polyethylene and polyester. European Patent Publication EP 481,471 131 and Penco et al., *Journal of Applied Polymer Science*, 57, 329 (1995) disclose compositions comprising a polyester, a linear low density polyethylene, an ethylene/ethyl acrylate/GMA terpolymer and 0.5% to 1% of an amine for the opening of an epoxy ring.

U.S. Pat. Nos. 5,483,001, 5,407,999, and 5,208,292 and *Die Angewandte Makromolekulare Chemie*, 1992, 196 p89, disclose polyester compositions having improved toughness which contain an ethylene/alkyl acrylate/GMA terpolymer, an ethylene/alkyl acrylate/maleic anhydride terpolymer, and a catalyst such as dimethylstearylamine which accelerates the reaction between the functional groups of the two terpolymers. U.S. Pat. No. 5,652,306 and European Patent Publication EP 737,715 A2 disclose polyester compositions containing MBS or acrylic-type core-shell impact modifiers combined with small amounts of an ethylene/alkyl acrylate/GMA terpolymer. U.S. Pat. Nos. 7,015,261 and 7,119,152 disclose an improved impact modifier for thermoplastic polyesters. The impact modifier is a blend of (A) a core/shell type impact modifier and (B) a linear copolymer derived from ethylene, (meth)acrylic esters, and monomer containing an epoxy group.

While several of the preceding patents discuss the use of added catalysts to promote a reaction between epoxy-containing ethylene polymers and a polyester, in none of these patents is there any disclosure that the toughness of the blend is affected by the presence of residues of catalysts used in the preparation of the polyester. polyesters typically are prepared using metal catalysts that remain in the polyester product. Examples of these catalysts include organic and inorganic compounds of arsenic, cobalt, tin, antimony, zinc, titanium, magnesium, gallium, germanium, sodium, lithium and the like. Titanium and antimony compounds are frequently used in the preparation of PET.

There is reference in U.S. Pat. No. 4,284,540 and in Stewart et al. *Poly. Eng. & Sci.*, 33 (11), 675 (1993), that certain residual catalysts present in PET can significantly affect the rate of reaction of epoxy functional polymers with PET. U.S. Pat. No. 4,284,540 notes that, among the above mentioned residual polyester polymerization catalysts, antimony catalyst residues are preferred for promoting the reaction between polyester and an epoxy group. The patent does not, however, provide any toughness data related to the presence of these catalyst residues. Stewart et al. quantified the rate of reaction between PET and a copolymer of ethylene and glycidyl methacrylate (E/GMA) by monitoring the rise in torque of a mixture of these two components in an instrumented mixing bowl (also known as a torque rheometer). According to Stewart et al., torque rheometry provides a simple and straightforward method for monitoring the viscosity of polymer blends as a function of blending time. The rheometer continuously measures the torque required to turn the rotor blades that shear and mix the sample within the mixing bowl. For a given material and set of processing conditions, the torque measured is approximately a linear function of the viscosity of the sample. Any change in viscosity with time is in turn related to such effects as changes in molecular weight of the sample (for example, an increase due to a reaction or a decrease due to degradation) or the formation of grafts, branches or crosslinks in the sample. The work by Stewart et al. shows that mixtures of E/GMA with PET containing antimony catalyst residues gives rise to significant increases in torque with mixing time. This led to the conclusion that PET containing antimony catalyst residues accelerated the reaction between the PET and the E/GMA. PET containing residual antimony catalyst was found to produce a more rapid increase in torque than PET containing other residual catalysts. It is often implied by those knowledgeable in the art that a rapid reaction between the E/GMA and the PET containing residual antimony catalyst should lead to better dispersion of the E/GMA (i.e., a smaller particle size) and better bond to the PET. This superior dispersion should, in turn, lead to improved toughness in the resultant blend. Furthermore, since the PET containing residual antimony catalyst reacts faster than the PET containing other catalysts, it is implied that the use of PET containing antimony catalyst residues should lead to tougher blends with epoxy containing ethylene copolymers.

Contrary to the teachings of the prior art discussed above, the toughness of blends of polyesters with epoxy-containing ethylene polymers is strongly affected by the presence of residues of catalysts used in the manufacture of the polyesters. Indeed, when epoxy-containing ethylene polymers are blended with polyesters containing antimony catalyst residues, the resulting polymer blend exhibits surprisingly low toughness values. Nonetheless, it has been found that superior toughness values are obtained when either (1) a phosphorus compound is added when making blends using polyesters that contain antimony catalyst residues or (2) when making blends using polyesters that do not contain antimony catalyst residues. As disclosed in JP 62-146950 and WO 00/15717 (incorporated herein by reference in its entirety), polyester compositions comprising a polyester containing antimony metal, epoxy-containing impact modifiers, and a phosphorus compound exhibit improved toughness. Further, JP 62-146949 and WO 00/15716 (incorporated herein by reference in its entirety) disclosed toughened polyester compositions comprising epoxy-containing impact modifiers and polyester containing residual tin or titanium and titanium or germanium catalyst, respectively. Also disclosed in WO 00/23520 (incorporated herein by reference in its entirety) are articles manufactured from polymer blends comprising epoxy-containing ethylene polymers and polyesters with residual antimony and phosphorus catalysts and polyesters with residual titanium and/or germanium catalysts.

Not wishing to be bound by any technical theories, it is believed that the antimony catalyst residues present in a polyester accelerates an epoxy-epoxy reaction within the epoxy-containing ethylene copolymer that can proceed concurrently with the reaction between the polyester and the epoxy-containing ethylene copolymer. For example, subsequent work using the same mixing bowl experiment as performed by Stewart et al. has shown that a similar increase in torque with time can be obtained when antimony acetate is added directly into an epoxy-containing ethylene copolymer with no PET present. The resultant epoxy-containing ethylene copolymer is highly crosslinked, suggesting that the catalyst is highly active in promoting reactions within the impact modifier itself. Transmission electron microscope images of blends of antimony-catalyzed PET with epoxy-containing ethylene copolymers show that the impact modifier has formed into large phases, many greater than 1 micron in size. These phases are too large to produce maximum toughness in the PET. It is believed that the phosphorus compound deactivates or partially deactivates the residual antimony catalyst, disabling the epoxy-epoxy reaction and allowing the epoxy-PET reaction.

It has now been discovered that polymer blends comprising certain polyester polymers and certain epoxy-containing impact modifiers exhibit improved toughness when the polyester utilized contain aluminum atoms and alkaline earth atoms or alkali metal atoms or alkali compound, i.e., residues from the use of aluminum atoms and alkaline earth atoms or alkali metal atoms or alkali compound residues in the manufacture of the polyester, especially when combined with phosphorus atoms. Furthermore, it has been found the inventive polymer blends prepared with PET polymers catalyzed with aluminum atoms, alkaline earth atoms or alkali metal atoms or alkali compound residues may be prepared using lower molecular weight PET polymers while maintaining the toughness of polymer blends prepared with conventional PET polymers of much higher molecular weight. Thus the PET polymers of the inventive blends exhibit a melt viscosity closer matched to the polyolefin based impact modifier, facilitating better dispersion of the impact modifier and are less expensive to manufacture. Alternatively, it is possible to obtain a polymer blend containing a polyester polymer and having improved toughness relative to a polymer blend containing a polyester having substantially the same It.V.

U.S. patent application Ser. No. 11/495,431 filed Jul. 28, 2006 and having common assignee herewith, discloses polyester compositions that include aluminum atoms in an amount of at least 3 ppm, based on the weight of the polymer, and that further include alkaline earth metal atoms or alkali metal atoms or alkali compound residues, the polymers having an It.V. of at least 0.72 dL/g obtained through a melt phase polymerization.

U.S. patent application Ser. No. 11/229,238, filed Sep. 16, 2005 and having common assignee herewith, discloses polyester compositions comprising polyester polymers, aluminum atoms, alkaline earth atoms or alkali metal atoms or alkali compound residues, and particles that improve the reheat rate of the compositions.

One aspect of the present invention is based on the catalyst system used in the synthesis of the one or more polyester polymers and the effect the catalyst system has on the toughness of the inventive polymer blends comprising the one or more polyesters polymers and an epoxy-containing impact modifier.

Polyester food trays are conveniently manufactured by first extruding a film of polyester, then thermoforming the tray in a heated die. This thermoforming process both forms the tray and crystallizes the polyester resin. The film material may be prepared in a process separate from the thermoforming process (sometimes referred to as the glass to mold process) or the film material may be prepared in-line with the thermoforming process (sometimes referred to as the melt to mold process). Processes for extruding polyester film and thermoforming the film material to produce crystalline PET (also commonly known as CPET) food trays are well known in the art.

SUMMARY OF THE INVENTION

In one aspect, the invention relates to polymer blends having improved low temperature toughness, that include one or more impact modifying polymers, and one or more polyethylene terephthalate homopolymers or copolymers containing aluminum atoms in an amount, for example, from about 3 ppm to about 60 ppm, and one or more alkaline earth metal atoms, alkali metal atoms, or alkali compound residues in an amount, for example, from about 1 ppm to about 25 ppm, in each case based on the weight of the one or more polyethylene terephthalate homopolymers or copolymers.

In another aspect, the invention relates to polymer blends comprising one or more impact modifiers present in an amount, for example, from about 2 weight percent to about 33 weight percent, or from 3 to 20 weight percent, or from 5 to 15 weight percent, or from 20 to 30 weight percent, in each case based on the total weight of the polymer blend.

In another aspect, the invention relates to polymer blends comprising one or more impact modifiers further comprising impact modifiers contains about 20 to 35 weight percent alkyl acrylate residues, about 2 to about 10 weight percent glycidyl methacrylate residues, or mixtures thereof and having a melt index from about 1 g per 10 minutes to about 30 g per 10 minutes as determined by ASTM D-1238

In one aspect, the invention relates to polymer blends comprising one or more polyethylene terephthalate homopolymers or copolymers further comprising aluminum atoms in an amount from about 5 ppm to about 35 ppm, or from about 5 ppm to 25 ppm aluminum, based on the weight of the one or more polyethylene terephthalate homopolymers or copolymers.

In another aspect, the aluminum atoms are provided to the one or more polyethylene terephthalate homopolymers or copolymers as one or more of an aluminum carboxylate, an aluminum glycolate, a basic aluminum carboxylate, or an aluminum alkoxide.

In another aspect, the invention relates to polymer blends comprising one or more polyethylene terephthalate homopolymers or copolymers further comprising alkaline earth atoms or alkali metal atoms in an amount ranging from 1 ppm to 25 ppm, based on the weight of the one or more polyethylene terephthalate homopolymers or copolymers.

In still another aspect, the invention relates to polymer blends comprising one or more polyethylene terephthalate homopolymers or copolymers further comprising alkaline earth metal or alkali metals, wherein the molar ratio of the alkaline earth metal or alkali metal atoms to the aluminum atoms is from 0.1 to 75.

In one aspect, the invention relates to polymer blends comprising one or more polyethylene terephthalate homopolymers or copolymers further comprising one or more of lithium atoms, sodium atoms, or potassium atoms, present in an amount from 5 ppm to 18 ppm, or lithium atoms in an about from about 7 ppm or about 15 ppm, in each case based on the weight of the one or more polyethylene terephthalate homopolymers or copolymers.

The polymer blend of the invention may further contain one or more polyethylene terephthalate homopolymers or copolymers comprising phosphorus atoms.

In one aspect, the invention relates to polymer blends comprising one or more polyethylene terephthalate homopolymers or copolymers further comprising phosphorus atoms in an amount from 10 ppm to 200 ppm, or from 10 ppm to 115 ppm, or from 10 ppm to 70 ppm, in each case based on the weight of the one or more polyethylene terephthalate homopolymers or copolymers.

In another aspect, the invention relates to polymer blends comprising one or more polyethylene terephthalate homopolymers or copolymers further comprising phosphorus atoms such that the ratio of moles of phosphorus to the total moles of aluminum, alkaline earth metals, and alkali metals is from 0.1 to 3.

In another aspect, the invention relates to polymer blends comprising one or more polyethylene terephthalate homopolymers or copolymers copolymers have an intrinsic viscosity of at least about 0.68 dL/g, or at least 0.70 dL/g, or at least 0.72 dL/g, or at least 0.75 dL/g, or at least 0.80 dL/g, or at least 0.84 dL/g obtained through a melt phase polymerization.

In another aspect, the invention relates to polymer blends comprising one or more polyethylene terephthalate homopolymers or copolymers further comprising:
(a) at least 80 mole percent residues of terephthalic acid, based on the total amount of dicarboxylic acid residues comprising 100 mole percent; and
(b) at least 80 mole percent residues of ethylene glycol, based on the total amount of diol residues comprising 100 mole percent; and wherein the amount of aluminum atoms in the one or more polyethylene terephthalate homopolymers or copolymers is from 3 ppm to 35 ppm, based on the weight of the one or more polyethylene terephthalate homopolymers or copolymers, and
wherein phosphorus atoms are present in the one or more polyethylene terephthalate homopolymers or copolymers in an amount from 10 ppm to 115 ppm.

In still another aspect, the invention relates to polymer blends comprising one or more polyethylene terephthalate homopolymers or copolymers further comprising:
(a) at least 92 mole percent residues of terephthalic acid, based on the total amount of dicarboxylic acid residues comprising 100 mole percent; and
(b) at least 92 mole percent residues of ethylene glycol, based on the total amount of diol residues comprising 100 mole percent; and
wherein the amount of aluminum atoms in the one or more polyethylene terephthalate homopolymers or copolymers is from 5 ppm to 25 ppm, based on the weight of the one or more polyethylene terephthalate homopolymers or copolymers, and wherein phosphorus atoms are present in the one or more polyethylene terephthalate homopolymers or copolymers in an amount from 10 ppm to 70 ppm.

In still another aspect, the invention relates to polymer blends comprising a nucleator present in an amount from about 0.01 wt % to about 10 wt %, or 1 wt % to 5 wt %, or 1 wt % to 3 wt %, in each case based on the total weight of the polymer blend.

In another aspect, the nucleator in the invention polymer blends comprise talc, carbon black, polyethylene, an aliphatic polyamide, or poly(tetramethylene terephthalate) homo- and co-polymers.

In another aspect, the polymer blend is in the form of an extruded film having a thickness of about 300 to about 1000 microns and an intrinsic viscosity (It.V.) in the range of about 0.6 to about 1.0 dL/g.

In another aspect, the polymer blend is in the form of a thermoformed tray having a thickness of about 300 to 1000 microns wherein the polyester comprising the polymer blend has an intrinsic viscosity (It.V.) in the range of about 0.6 to about 1.0 dL/g and a crystallinity between about 20 percent and 35 percent.

In another aspect, a method for the manufacture of an article comprising the steps of:
(1) heating a film of the polymer blend to a temperature of about 125 to 165° C. or extruding a molten film of polymer blend;
(2) positioning the heated or molten film over the opening of a mold having a surface temperature of about 120 to 180° C.;

(3) causing the heated or molten film to conform to the shape of the mold to form a shaped article;
(4) retaining the shaped article within the mold to induce at least 24 percent or at least 28 crystallization of the polyester composition; and
(5) removing the shaped article from the mold In still another aspect, the thermoformed article is a tray.

DETAILED DESCRIPTION OF THE INVENTION

The present invention may be understood more readily by reference to the following detailed description of the invention.

As used in the specification and the appended claims, the singular forms "a," "an" and "the" include plural referents unless the context clearly dictates otherwise. For example, reference to processing or making a "polymer," a "blend," "article," "film," or "tray" is intended to include the processing or making of a plurality of polymers, blends, articles, films or trays.

Specifically, when a "polymer" is referred to in the specification and the claims, the term should be construed to include not just the reaction product of a single polymerization, but also to blends or physical mixtures of more than one polymer, since the thermoplastic polymers described herein may be satisfactorily blended with one another so that it may be difficult to afterward identify the source. Thus, the phrase "a PET homopolymer or copolymer" should be construed, for example, to include both the product of a single polymerization as well as mixtures of more than one PET homopolymer or copolymer, and the phrase a "polyethylene copolymer or terpolymer" should be construed, for example, to include both the reaction product of a single polymerization as well as mixtures of more than one polyethylene copolymer or terpolymer reaction products.

References to a composition containing "an" ingredient or "a" polymer is intended to include other ingredients or other polymers, respectively, in addition to the one named. For example, when we refer to "a" transition metal, the phrase is intended to include the use or presence of more than one transition metal. Similarly, when we refer to a PET homopolymer or copolymer, or to a polyolefin-based copolymer or terpolymer, the phrases are intended to include the use or presence of more than one of the polymers.

By "comprising" or "containing" or "having" we mean that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

When we say that the one or more impact modifiers are added to or blended with the one or more PET homopolymers or copolymers (sometimes hereinafter described simply as the "PET polymer") the impact modifiers may either be added neat or as a concentrate, unless the context indicates otherwise.

By "copolymer" we mean the at least one or more dissimilar monomers have been polymerized with or grafted onto those monomers combined to form the primary structure of polymer. The term "copolymer" as used herein, describes copolymers as well as polymers containing multiple comonomers such as terpolymers.

When we say the film (a.k.a., sheet), we are referring to an amorphous, or vitrified, film comprising the inventive polymer blends that has been extruded through a film die then cooled to a temperature below the glass transition temperature such that the polyester polymer component of the polymer blend from which the film (a.k.a., sheet) is comprised has less than about 10 percent crystallinity, or less than 5 percent crystallinity, or less than 2 percent crystallinity. The term film (a.k.a., sheet), amorphous film (a.k.a., amorphous sheet), or vitrified film (a.k.a., vitreous sheet) are synonymous and are not indicative of any temperature and includes temperatures up to that which the film is heated to enable thermoforming and crystallization. In comparison, when we say molten film (a.k.a., molten sheet), we are referring to the molten polymer blend as it extruded from a film die and prior to cooling to the glass transition temperature of the polyester polymer component of the polymer blend from which the molten film is comprised.

It is also to be understood that the mention of one or more method steps does not preclude the presence of additional method steps before or after the combined recited steps or intervening method steps between those steps expressly identified, unless otherwise indicated.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

As used throughout the specification, "ppm" is parts per million by weight.

By "atoms" of a metal we mean the metal atom occupying any oxidation state, any morphological state, any structural state, and any chemical state, whether as added to or as present in the polymer or composition of matter.

By the term "residue(s)" we mean the portion of a monomer(s) which remains after the monomer(s) are polymerized to form a polymer or oligomer chain, regardless of length.

The intrinsic viscosity (It.V.) values described throughout the description are set forth in dL/g units as calculated from the inherent viscosity measured at 25° C. with 0.5 grams of sample in 100 ml of 60/40 wt/wt phenol/tetrachloroethane.

When we say that the polymer blends of the invention have "improved low temperature impact toughness," we mean the samples prepared for the inventive polymer blends, when tested as described in the experimental section, exhibits a transition from a ductile failure mode to a brittle failure mode as the test temperature is lowered, at a lower temperature than polymer blends prepared with conventional PET polymers.

We have discovered that polymer blends comprising: one or more PET homopolymers or copolymers prepared in the melt phase using a catalyst system comprising aluminum and one or more alkaline earth atoms, alkali metal atoms, or alkali compound residues (e.g., lithium); and one or more polyolefin copolymers containing reactive functional groups, described elsewhere herein, exhibit excellent ductile-to-brittle transition temperature values. For example, the thermoformed trays having a thickness ranging from 18 mil to 22 mils having a degree of crystallinity ranging from 25% to 30% obtained from polymer blends of the invention containing an impact modifier loading ranging from 4 to 14 wt. %, or 5 to 12 wt. %, based on the weight of the polymer blend, said blend containing a polyester polymers having an It.V. of 0.88 dL/g or less, or 0.86 dL/g or less, or 0.84 dL/g or less, or 0.82 dL/g or less, are capable of obtaining ductile-to-brittle transition temperature values of −25° C. or less, or −28° C. or less, or −30° C. or less, or −35° C. or less, or −37° C. or less, or −40° C. or less, or −45° C. or less. The ductile-to-brittle transition temperature test method is described further below, using the modified testing protocol based on ASTM D1790-02 (i.e., "Standard Test Method for Brittleness Temperature of Plastic Sheeting by Impact).

We have also discovered that polymer blends comprising: one or more PET homopolymers or copolymers containing aluminum atoms and one or more alkaline earth atoms, alkali metal atoms, or alkali compound residues (e.g., lithium); and one or more polyolefin copolymers containing reactive functional groups, described elsewhere herein, exhibit improved low temperature impact toughness compared with polymer blends prepared using PET polymers containing conventional catalyst systems. For example, the comparative polymer blends of the examples that include PET polymers prepared via conventional melt-phase polycondensation using antimony catalysts, followed by solid-state polymerization to achieve the final It.V., exhibit relatively poor low temperature impact toughness as measured by the ductile-to-brittle transition temperature compared with the inventive blends described herein.

We have also discovered that polymer blends of the invention can be prepared with a polyester polymers having much lower It.V. that polymer blends using polyester polymers prepared with conventional catalyst systems such as antimony while maintaining similar low temperature impact toughness, thereby eliminating the need to manufacture polyester polymers having high It.V. used to make up for the loss in molecular weight during extrusion, and now being able to more closely match the It.V. of the polyester polymers with that of the impact modifier.

The It.V. drop experienced with melt processing a polyester polymers into the form of an article is reduced when the polyester polymers of the invention is employed relative to PET polymers made with conventional catalysts. For example, there is provided a process for making an article (e.g. sheet or thermoformed tray or film, molten or vitrified) comprising feeding a polyester polymers to a melt processing zone wherein at least 95 wt. %, or at least 97 wt. %, or at least 99 wt. %, or 100 wt. % of the polyester polymers fed to the melt processing zone have a starting It.V. of 0.90 dL/g or less, or 0.88 or less, or 0.86 or less, combining the polyester polymers with an impact modifier in the melt processing zone, and extruding the article having a final It.V, wherein the final It.V. of the article is within at least 70%, or at least 72%, or at least 74%, or at least 76%, or at least 80%, or at least 82%, or at least 85% of the starting It.V. of the polyester polymers, and the article has a ductile brittle transition temperature greater than the absolute value of −25° C., or at least −27° C., or at least −30° C.

In one aspect, the invention relates to polymer blends that comprise one or more polyethylene terephthalate (PET) homopolymers or copolymers prepared in the melt phase polymerization in the presence of a catalyst system comprising aluminum and one or more alkaline earth metal atoms, alkali metal atoms, or alkali compound residues as a catalyst system. The polymer blends of the invention further comprise one or more impact modifiers and having improved low temperature impact toughness.

The polyester polymers of the invention include any polymer having polyester linkages, preferably also containing aromatic moieties. Among the preferred polyester polymers are polymers containing ethylene terephthalate linkages. Typical among these are polyethylene terephthalate homopolymers or copolymers. The polyester polymers may comprise polymer blends including polyethylene terephthalate homopolymers or copolymers, further described below.

The polyester polymers are thermoplastic and include aluminum atoms, for example in an amount of at least 3 ppm based on the weight of the polymer, as well as one or more alkaline earth metal atoms, alkali metal atoms, or alkali compound residues, for example lithium. Such polymers typically have an It.V. of at least 0.72 dL/g, obtained during melt phase polymerization.

The PET homopolymers or copolymers of which the inventive blends are comprised include those disclosed and claimed in U.S. patent application Ser. No. 11/495,431, filed Jul. 28, 2006, and having common assignee herewith, the disclosure of which is incorporated herein by reference in its entirety.

In another aspect, the polyester polymers comprise aluminum atoms, as well as one or more alkaline earth metal atoms, alkali metal atoms, or alkali compound residues, provided as a catalyst system, and further comprise a catalyst deactivator effective to at least partially deactivate the catalytic activity of the combination of the aluminum atoms and the alkaline earth metal atoms, alkali metal atoms, or alkali compound residues.

In one aspect, the polyester polymers are made by a process comprising polycondensing a polyester polymer melt in the presence of aluminum atoms and one or more alkaline earth metal atoms, alkali metal atoms, or alkali compounds.

In yet another aspect of the invention, the polyester polymers suitable for use according to the invention may be produced by a process that includes a step of adding phosphorus atoms to a polyester melt containing aluminum atoms and alkaline earth metal atoms or alkali metal atoms or alkali compound residues, for example lithium atoms.

The polymer blends of the invention, containing one or more PET homopolymers or copolymers prepared using the catalyst systems just described and further elaborated upon below, blended with the one or more impact modifiers described elsewhere herein, possess improved low temperature impact toughness compared with PET polymers prepared using conventional catalyst systems.

Thus, the PET homopolymers or copolymers useful according to the invention comprise, as a catalyst system, aluminum atoms and one or more alkaline earth atoms, alkali metal atoms, or alkali compound residues, optionally deactivated with one or more catalyst deactivators.

The aluminum atoms may be present, for example, in an amount from about 1 ppm to about 35 ppm, or from 5 ppm to 25 ppm, or from 10 ppm to 20 ppm, in each case based on the total weight of the polyester polymers.

The one or more alkaline earth atoms (e.g., lithium, sodium, or potassium), alkali metal atoms (e.g., magnesium or calcium), or alkali compound residues may be present, for example, in a total amount from about 1 ppm to about 25 ppm, or from 1 ppm to 20 ppm, or from 5 ppm to 18 ppm, or from 8 ppm to 15 ppm, in each case based on the total weight of the one or more PET homopolymers or copolymers.

In one aspect, the one or more alkaline earth atoms, alkali metal atoms, or alkali compound residues comprises lithium. In this aspect, the amount of lithium may be, for example, from about 1 ppm to about 25 ppm, or from 5 ppm to 20 ppm, or from 8 ppm to 15 ppm, in each case based on the total weight of the polyester polymers.

In the processes by which the polyester polymers are prepared, the catalyst systems used may be deactivated by one or more catalyst deactivators, for example phosphorus atoms. If present, the amount of phosphorus atoms may range, for example, up to about 200 ppm, or up to 150 ppm, or up to 115 ppm, or up to 70 ppm.

In one aspect, the polyester polymers may have intrinsic viscosities (It.V.) in the range, for example, of about 0.50 to about 1.1, or inherent viscosities (Ih.V) in the range of about 0.52 to about 1.2.

In the processes by which the polyester polymers are produced, the final It.V. of the polyester polymer is typically attained entirely in the melt phase polymerization process. This is in contrast with conventional processes, in which the molecular weight of the polyester polymer is increased to a moderate It.V., solidified, and then followed by solid-phase polymerization to continue the molecular weight increase to the final desired higher It.V. The conventional process does not permit appreciable catalyst deactivation in the melt phase, because the subsequent solid-phase polymerization requires catalysis. Since the process is capable of building the molecular weight to the desired final It.V. entirely in the melt phase, the catalyst may be at least partially deactivated to thereby avoid at least some of the catalytic activity upon subsequent melting of polyester polymer.

Thus, in one aspect, the polyester polymers comprise aluminum atoms, present in an amount of at least 3 ppm based on the weight of the polymer, said polymer having an It.V. of at least 0.72 dL/g obtained through a melt phase polymerization.

In another aspect, the polyester polymers comprise: (i) aluminum atoms, (ii) alkaline earth metal atoms or alkali metal atoms or alkali compound residues, and (iii) a catalyst deactivator in an amount effective to at least partially deactivate the catalytic activity of the combination of the (i) aluminum atoms and (ii) the alkaline earth metal atoms or alkali metal atoms or alkali compound residues.

The polyester polymers useful according to the invention may crystallize during thermoforming of the food tray and preferably comprise:
  (i) a carboxylic acid component comprising at least 80 mole % of the residues of terephthalic acid, and
  (ii) a hydroxyl component comprising at least 80 mole % of the residues of ethylene glycol or 1,3-propanediol,
based on 100 mole percent of carboxylic acid component residues and 100 mole percent of hydroxyl component residues in the polyester polymers(s).

Typically, the PET polymers are made by reacting diols comprising ethylene glycol with dicarboxylic acids comprising terephthalic acid (as the free acid or its $C_1$-$C_4$ dialkyl ester) to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of the polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the PET polymers refers to the portion of the compound(s) which remains in the PET polymers after the compound(s) is condensed with a compound(s) containing hydroxyl group(s) and further polycondensed to form PET polymer chains of varying length.

More than one compound containing hydroxyl group(s) or derivatives thereof can become part of the PET polymers. All the compounds that enter the process containing hydroxyl group(s) or derivatives thereof that become part of the PET polymers comprise the hydroxyl component. The mole % of all the compounds containing hydroxyl group(s) or derivatives thereof that become part of the PET polymers add up to 100. The "residues" of hydroxyl functional compound(s) or derivatives thereof that become part of the PET polymers refers to the portion of the compound(s) which remains in the PET polymers after the compound(s) is condensed with a compound(s) containing carboxylic acid group(s) or derivative(s) thereof and further polycondensed to form PET polymer chains of varying length.

The mole % of the hydroxyl residues and carboxylic acid residues in the polyester polymers can be determined, for example, by proton NMR.

In other aspects, the one or more PET homopolymers or copolymers comprise:
  (a) a carboxylic acid component comprising at least 90 mole %, or at least 92 mole %, or at least 96 mole % of the residues of terephthalic acid, or derivates of terephthalic acid, and
  (b) a hydroxyl component comprising at least 90 mole %, or at least 92 mole %, or at least 96 mole % of the residues of ethylene glycol or 1,3-propanediol, more preferably ethylene glycol,
based on 100 mole percent of the carboxylic acid component residues and 100 mole percent of the hydroxyl component residues in the PET polymers.

Modifiers may be present in amount of up to 40 mole %, or up to 20 mole %, or up to 10 mole %, or up to 8 mole %, or up to 5 mole %, based on the 100 mole percent of their respective component, carboxylic acid or hydroxyl, in the polymer. Mono-, tri-, and higher-functional modifiers are typically present and/or added in amounts of only up to about 8 mole %, or up to 4 mole %, or up to about 2 mole %, based on the 100 mole percent of their respective component, carboxylic acid or hydroxyl, in the polymer.

In addition to a diacid component of terephthalic acid or derivatives of terephthalic acid, the carboxylic acid component(s) of the present PET polymers may include one or more additional modifier carboxylic acid compounds, such as naphthalene-2,6-dicarboxylic acid, derivatives of naphthalene-2,6-dicarboxylic acid, or mixtures thereof, mono-carboxylic acid compounds, other dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as part of an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, and naphthalene-2,6-dicarboxylic acid being especially suitable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the PET polymers, along with monocarboxylic acid chain terminators.

Derivatives of terephthalic acid suitable for inclusion include $C_1$-$C_4$ dialkylterephthalates, such as dimethylterephthalate and dimethylnaphthalate.

In addition to a hydroxyl component comprising ethylene glycol, the hydroxyl component of the present PET polymers may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. As hydroxyl component modifiers, the PET polymers may preferably contain such comonomers as 1,4-cyclohexanedimethanol and diethylene glycol.

The PET polymers may be blended with polyalkylene naphthalates or other thermoplastic polymers such as polycarbonate (PC) and polyamides. It is preferred, however, that the PET polymers are comprised predominantly of repeating polyethylene terephthalate polymers, for example in an amount of at least 80 wt. %, or at least 90 wt. %, or at least 95 wt. %, based on the total weight of the PET homopolymers or copolymers.

The polyester polymers useful according to the invention thus include aluminum atoms that comprise an aluminum residue, that is the moiety remaining in a polymer melt upon addition of aluminum atoms to the melt phase process for making the polyester polymers, without regard to the oxidation state, morphological state, structural state, or chemical state of the aluminum compound as added or of the residue present in the composition. The aluminum residue may be in a form identical to the aluminum compound as added to the melt phase reaction, but typically will be altered since the aluminum is believed to participate in accelerating the rate of polycondensation. By the term "aluminum atoms" or "aluminum" we mean the presence of aluminum in the polyester polymer detected through any suitable analytical technique regardless of the oxidation state of the aluminum. Suitable detection methods for the presence of aluminum include inductively coupled plasma optical emission spectroscopy (ICP). The concentration of aluminum is reported as the parts per million of metal atoms based on the weight of the polyester polymers. The term "metal" does not imply a particular oxidation state.

Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethylate, aluminum isopropylate, aluminum tri n-butyrate, aluminum tri-tert-butyrate, mono-sec-butoxyaluminum diisopropylate, aluminum glycolates such as aluminum ethylene glycolate, and aluminum chelates in which the alkoxy group of an aluminum alcoholate is partially or wholly substituted by a chelating agents such as an alkyl acetoacetate or acetylacetone such as ethyl acetoacetate aluminum diisopropylate, aluminum tris(ethyl acetoacetate), alkyl acetoacetate aluminum diisopropylate, aluminum monoacetylacetate bis (ethyl acetoacetate), aluminum tris(acetyl acetate), aluminum acetylacetonate.

Preferred among the aluminum compounds are the basic carboxylic acid salts of aluminum and aluminum alcoholates. Basic carboxylic acid salts of aluminum include monobasic and dibasic compounds. The basic aluminum acetate used can be either the diacetate monohydroxy compound or the monoacetate dihydroxy compound or a mixture thereof. In particular, basic aluminum acetate and aluminum isopropoxide are preferred aluminum compounds. Stabilizing basic aluminum acetate with boric acid may in some instances increases its solubility. Aluminum isopropoxide is most desirable.

The amount of aluminum present in the polyester polymers generally ranges from at least 3 ppm, or at least 5 ppm, or at least 8 ppm, or at least 10 ppm, or at least 15 ppm, or at least 20 ppm, or at least 30 ppm, and up to about 150 ppm, or up to about 100 ppm, or up to about 75 ppm, or up to about 60 ppm aluminum based on the weight of the polymer. The preferred range of aluminum is from 5 ppm to 60 ppm. Other suitable amounts include from 7, or from 10 ppm and up to 60 ppm, or up to 40 ppm, or up to 30 ppm aluminum atoms.

An alkali metal residue or an alkaline earth metal residue is the alkali metal atoms or alkaline earth metal atoms present in the polyester polymers in any form or oxidation state, or if an alkali compound is used, then the residual remainder of the alkali compound present within the polymer melt or the finished polymer or article, without regard to the oxidation states or ultimate physical, morphological, structural, or chemical states. The word "alkali metal" or "alkaline earth metal" or "metal" includes the atom in its elemental state or in an oxidation state corresponding to its allowable valences in its Periodic group. The chemical state of the alkali upon addition is also not limited. The alkali may be added as a metal compound, organometallic compound, or as a compound without a metal. Likewise, the chemical state of the alkaline earth metal compound or alkali metal compound upon addition is not limited.

The alkali metals and alkaline earth metals include the metals in Group IA and Group IIA of the periodic table, including Li, Na, K, Rb, Cs, Mg, Ca, Sr, and especially Li, Na or K. If rapid rates and clarity are the primary concern, Li may be preferred. If color is the primary concern, Na may be preferred. The metals may be added to the melt phase as metal compounds (which includes a complex or a salt) having counterions, among which the preferred ones are hydroxides, carbonates, and carboxylic acids.

Other suitable alkali compounds are those mentioned in U.S. Pat. No. 6,156,867, the relevant disclosure of which is incorporated herein by reference. They include the tertiary amine compounds and the quaternary ammonium compounds. The particular amine compounds selected are desirably those which do not impart more yellow color to the polymer.

The ratio of the moles of alkali metal or moles of alkaline earth metal or moles of alkali to the moles of aluminum (M:Al mole ratio, M:Al MR) generally ranges from at least 0.1, or at least 0.25, or at least 0.5, or at least 0.75, or at least 1, or at least 2, and up to about 75, up to about 50, up to about 25, up to about 20, up to about 15, up to about 10, or up to about 8, or up to about 6, or up to about 5.

The weight of aluminum and alkaline earth metal or alkali metal can be measured by analytical techniques for detecting the amount in the finished polyester polymers or article. Suitable detection methods for the presence of aluminum and alkali metals or alkaline earth metals include inductively coupled plasma optical emission spectroscopy (ICP). While X-ray fluorescence spectroscopy (XRF) is a suitable detection method for some alkaline earth metals and some alkali metals, it may not be suitable for detecting aluminum at lower levels, like those found in polyester polymers. As used herein, the concentration of an alkaline earth metal or an alkali metal is reported as the parts per million of metal atoms based on the weight of the polyester polymers.

The aluminum and alkali or alkaline earth metals may be added as a solution, fine dispersion, a paste, a slurry, or neat. They are preferably added as a liquid, a melt, or a free flowing solid which can be metered. Most preferably they are added as a liquid, and in particular as a liquid solution or dispersion.

To avoid potential undesirable side reactions between aluminum catalyst and water generated in the esterification zone which may inhibit or deactivate the aluminum catalyst and thereby slow down the rate of polycondensation, it is desirable to add the aluminum compounds after substantial completion of the esterification reaction or at the beginning of or during polycondensation. In a further embodiment, at least 75%, or at least 85%, or at least 95% of the esterification reaction (in terms of conversion) is conducted in the absence of added aluminum compounds. It is desirable to add the aluminum compound and the alkali metal or alkaline earth metal compound at or near the same addition point. It is most desirable to premix and heat the aluminum compound and the alkali metal or alkaline earth metal compound, like in a catalyst mix tank, prior to addition to the melt phase manufacturing line for polyester polymers.

Other catalyst metals may be present, if desired. For example, Mn, Zn, Sb, Co, Ti, and/or Ge catalysts may be used in conjunction with aluminum and alkaline earth metals or alkali catalysts. Titanium catalysts can be used, particularly if melt phase manufacture involves ester exchange reactions, or the reactions may be carried out in the substantial absence of titanium. Suitable titanium catalysts include those compounds added in amounts which increase the It.V. of the polyester polymers melt by at least 0.3 dL/g, if not deactivated, under the operating conditions used to make the polyester polymer.

In one aspect, the amount of antimony may be limited, or antimony may be absent from the reaction mixture. Thus, the amount of antimony present may be, for example, 0 ppm, that is, the reactions may be carried out in the absence of antimony. Alternatively, the amount of antimony present may be no more than 10 ppm, or no more than 20 ppm, or no more than 40 ppm, or no more than 60 ppm, in each case based on the weight of the one or more polyethylene terephthalate homopolymers or copolymers. Without wishing to be bound by any theory, we believe that the presence of antimony may catalyze internal cross-linking of the impact modifiers' reactive groups and may interfere with the low temperature impact performance of the inventive polymer blends, and that polyesters made using the catalyst systems described herein may have substantially improved low temperature impact performance when compared with polyesters or blends containing substantial amounts of antimony.

Typically, the titanium catalyst added during ester exchange will be deactivated prior to polycondensing the resulting oligomer mixture since, left untreated before polycondensing, the titanium catalyst may discolor the polymer due to its high activity, which includes side reactions. However, if desired, small quantities of active titanium catalysts may be present with the catalyst system of the invention. The amount of titanium catalyst, if used, generally ranges from 2 ppm to 15 ppm, based on the weight of the polyester polymers.

Preferably, the polyester polymers of the inventive polymer blends are made without the addition of titanium, cobalt, or antimony to the melt phase reaction, or even without the addition of any catalytically active metal or metal compounds to the melt phase reaction other than the aluminum/alkali metal or alkaline earth or alkali system (e.g., for measurement purposes compounds are catalytically active if they increase the reaction rate or increase the It.V. by at least 0.1 dL/g from a starting point of 0.2 to 0.4 dL/g after 1 hour at 280° C. and 0.8 mm Hg with agitation). It is to be recognized, however, that one or more of metals such as cobalt or manganese will most likely be present at low levels in the melt because they come as impurities with the terephthalic acid composition made from a metal-catalyzed, liquid-phase oxidation process.

The polyester polymers suitable for use in the inventive blends may also contain a catalyst deactivator. By a catalyst deactivator we mean a compound effective to at least partially deactivate or inhibit the activity of the catalyst system. A compound is effective to at least partially deactivate the catalyst system when by its addition at a given level, and solely for testing the effectiveness of a compound at a given level, when either or both a) the rate of solid-stating under actual operating conditions is reduced relative to the same polymer without the deactivator ("no additive case") and/or b) when added earlier, the rate of melt-phase polycondensation under actual operating conditions to a constant It.V. target is reduced, that is, it takes more time to reach the It.V. target, or the It.V. of the polymer is reduced at constant time relative to the no additive case.

The catalyst deactivator is typically added late during the process of manufacturing the polyester polymers melt in order to limit the activity of catalyst system during subsequent melt processing steps, in which the catalyst system may otherwise catalyze internal cross-linking of the impact modifiers reactive groups. The catalyst deactivator may also help thermally stabilize the polyester polymers melt near the end of melt phase polycondensation and during remelting which occurs, for example, during melt blending and processing the inventive polymer blends into articles, without which more reactions would occur to cleave the polymer chains in the highly viscous melt. The catalyst deactivator is not added along with the addition of aluminum compounds or alkali metal compounds or alkaline earth metal compounds or alkali compounds, nor is it added at the commencement of polycondensation because it would inhibit the catalytic activity of the metal catalysts and hence, the rate of polycondensation. It should be noted, however, that not all types or forms of phosphorus compounds are deactivators, and if they are not, they may, if desired, be added along with the catalyst or at the commencement of polycondensation.

Suitable deactivating compounds are preferably phosphorus-containing compounds, for example phosphate triesters, acidic phosphorus compounds or their ester derivatives, and amine salts of acidic phosphorus containing compounds. Acidic phosphorus compounds have at least one oxyacid group, that is, at least one phosphorus atom double-bonded to oxygen and single-bonded to at least one hydroxyl or OH group. The number of acidic groups increases as the number of hydroxyl groups, bound to the phosphorus atom that is double-bonded to oxygen, increases. Specific examples of phosphorus compounds include phosphoric acid, pyrophosphoric acid, phosphorous acid, polyphosphoric acid, carboxyphosphonic acids, alkylphosphonic acids, phosphonic acid derivatives, and each of their acidic salts and acidic esters and derivatives, including acidic phosphate esters such as phosphate mono- and di-esters and non-acidic phosphate esters (e.g., phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mono-, di-, and tri-esters of phosphoric acid with ethylene glycol, diethylene glycol, or 2-ethylhexanol, or mixtures of each. Other examples include distearylpentaerythritol diphosphite, mono- and di-hydrogen phosphate compounds, phosphite compounds, certain inorganic phosphorus compounds that are preferably soluble in the polymer melt, poly(ethylene)hydrogen phosphate, and silyl phosphates. Haze in solutions of particles or in molded parts is one indication of the lack of solubility or limited solubility of an additive in the polymer melt. Soluble additives are more likely to deactivate/stabilize the catalyst system.

Other phosphorus compounds which may be added include the amine salts of acidic phosphorus compounds. The amines may be cyclic or acyclic, may be monomeric, oligomeric, or polymeric, and should be selected so as to minimize haze and/or maximize solubility when these are issues. The organic constituents of the amine may in principle be any organic group. Ammonia and related compounds like ammonium hydroxide are suitable.

Suitable organic groups on the amine include linear and branched alkyl, cycloalkyl, aryl, aralkyl, alkaryl, heteroaryl, etc. Each of these types of organic groups may be substituted or unsubstituted (e.g., with hydroxy, carboxy, alkoxy, halo, and like groups). The organic groups may also contain carbonate, keto, ether, and thioether linkages, as well as amide, ester, sulfoxide, sulfone, epoxy, and the like. This list is illustrative and not limiting.

Preferred amines are cyclic amines having a 5 to 7 membered ring, preferably a six membered ring. These rings may constitute a single "monomeric" species, or may be part of a larger oligomer or polymer.

Preferred cyclic amines are hindered amines which have organic groups substituted at ring positions adjacent to the ring nitrogen. The ring nitrogen itself may also be substituted (e.g., by alkyl, aryl, aralkyl, alkaryl, and other groups). The hindered amines may also comprise a portion of an oligomeric moiety or polymeric moiety.

Another type of suitable amines are amino acids. Amino acids with decomposition points at or above polymerization temperatures are especially preferred. The L-enantiomer, the D-enantiomer or any mixture thereof, including racemic mixtures, may be used. The amine group and the carboxylic acid group do not have to be attached to the same carbon. The amino acids may be alpha, beta or gamma. Substituted amino acids may be used. Amino acids with some solubility in water are especially preferred as this allows the synthesis of the salt to be done in water, that is, without VOC's (volatile organic compounds).

The quantity of phosphorus compound or other catalyst deactivator used in this process is effective to reduce, for example, the amount of internal cross-linking of the impact modifier's reactive groups upon remelting the polymer produced in the melt phase by partially or fully deactivating the catalytic activity of the combination of the (i) aluminum atoms and (ii) the alkaline earth metal atoms or alkali metal atoms or alkali compound residues. Typical amounts of phosphorus atoms will be at least 15 ppm, or at least 50 ppm, or at least 100 ppm, or at least 150 ppm, or at least 200 ppm.

The cumulative amount of aluminum, alkali or alkaline earth metals, and any other catalyst metals present in the melt should be considered. The ratio of the moles of phosphorus to the total moles of aluminum and alkaline earth metal and/or alkali metal (P:M MR where M is deemed to be the sum of the moles of aluminum, the moles of alkaline earth metals, if present and the moles of alkali metals, if present, and where MR stands for mole ratio) is generally at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1. Large quantities of phosphorus compounds should be avoided to minimize the loss in polymer It.V. upon addition of the phosphorus compound to the polyester melt. A suitable range for P:M MR is 0.5 to 1.5.

Compounds of metals other than aluminum, alkali metals and alkaline earth metals also react with phosphorus compounds. If, in addition to compounds of aluminum, alkali metals and/or alkaline earth metals, other metal compounds that react with phosphorus compounds are present, then the amount of phosphorus compound added late is desirably in excess of that required to achieve the targeted P:M MR to ensure that the phosphorus compounds react or combine with all reactive metals present.

The polyester polymers useful for the inventive polymer blends contain aluminum atoms within a range of about 5 ppm to about 100 ppm, or 7 to 60 ppm, or 10 ppm to 30 ppm, based on the weight of the polyester polymer, and the molar ratio of all alkaline earth metal and alkali metal atoms to the moles of aluminum atoms may be within a range of about 0.5:1 to about 6:1, or 1:1 to 5:1, or 2:1 to 4:1, and the P:M ratio ranges from about 0.1:1 to about 3:1, or 0.3:1 to 2:1, or 0.5:1 to 1.5:1.

If desired, a partial amount of phosphorus compound may be added early in the melt phase manufacturing process, such as at the initiation of polycondensation, and a final amount added late in the course of polycondensation or thereafter but before solidification as explained further below. To maximize polycondensation and/or production rates, the majority, or the bulk, or the whole of the phosphorus compound is added late to the melt phase manufacturing process.

The polyester polymers may be made in a melt phase reaction comprising forming a polyester polymer melt in the presence of an aluminum compound and an alkali metal or an alkaline earth metal compound or alkali compound. At least a portion of the polycondensation reaction proceeds in the presence of the combination of an aluminum compound, and an alkali metal compound, alkaline earth metal compound, or alkali compound. The various ways in which aluminum compound, the alkali metal compound, the alkaline earth metal compound or alkali compound can be added, their order of addition, and their points of addition are described in U.S. patent application Ser. No. 11/495,431, incorporated herein by reference in its entirety and further elaborated upon below.

Polyester precursor reactants may be fed to an esterification reaction vessel where the first stage of the melt phase process is conducted. The esterification process proceeds by direct esterification or by ester exchange reactions, also known as transesterification. In the second stage of the melt phase process, the oligomer mixture formed during esterification is polycondensed to form a polyester melt. The molecular weight of the melt continues to be increased in the melt phase process to the desired It.V.

To further illustrate, a mixture of one or more dicarboxylic acids, preferably aromatic dicarboxylic acids, or ester forming derivatives thereof, and one or more diols, such as ethylene glycol, are continuously fed to an esterification reactor operated at a temperature of between about 200° C. and 300° C., and at a super-atmospheric pressure of between about 1 psig up to about 70 psig. The residence time of the reactants typically ranges from about one to about five hours. Normally, the dicarboxylic acid(s) is directly esterified with diol(s) at elevated pressure and at a temperature of about 240° C. to about 285° C. The esterification reaction is continued until an acid or ester group conversion of at least 70% is achieved, but more typically until an acid or ester group conversion of at least 85% is achieved to make the desired oligomeric mixture.

The resulting oligomeric mixture formed in the esterification zone (which includes direct esterification and ester exchange processes) includes bis(2-hydroxyethyl)terephthalate (BHET) monomer, low molecular weight oligomers, DEG, and trace amounts of condensation by-product not totally removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or an ester exchange process in which case the relative quantity of BHET predominates over the oligomeric species. Water is removed as the esterification reaction proceeds in order to drive the equilibrium toward the desired products. Methanol is removed as the ester exchange reaction of a dimethyl ester of a dicarboxylic acid proceeds in order to drive the equilibrium toward the desired products. The esterification zone typically produces the monomer and oligomer species, if any, continuously in a series of one or more reactors. Alternately, the monomer and oligomer species in the oligomeric mixture could be produced in one or more batch reactors. At this stage, the It.V. is usually not measurable or is less than 0.1 dL/g. The average degree of polymerization of the molten oligomeric mixture is typically less than 15, and often less than 7.0.

The reaction to make the oligomeric mixture is otherwise preferably uncatalyzed in the direct esterification process and additionally catalyzed in ester exchange processes. Typical ester exchange catalysts which may be used in an ester exchange reaction include titanium compounds and tin compounds, zinc compounds, and manganese compounds, each used singly or in combination with each other. Alkali metal compounds, such as those of lithium or sodium, or alkaline earth compounds, such as those of magnesium or calcium, may also be used as ester exchange catalysts. Any other catalyst materials well known to those skilled in the art are suitable.

Titanium based catalysts present during the polycondensation reaction may negatively impact the b* by making the melt more yellow. While it is possible to deactivate the titanium based catalyst with a stabilizer after completing the ester exchange reaction and prior to commencing polycondensation, it is desirable to eliminate the potential for the negative influence of the titanium based catalyst on the b* color of the melt by conducting the direct esterification or ester exchange reactions in the absence of any added titanium containing compounds. Thus, in one aspect, the direct esterification or ester exchange reactions are carried out in the absence of titanium, or titanium is present in an amount, for example, of no more than 1 ppm, or no more than 3 ppm, or no more than 5 ppm, or no more than about 10 ppm, in each case with respect to the weight of the melt. Suitable alternative ester exchange catalysts include zinc compounds, manganese compounds, or mixtures thereof.

Once the oligomeric mixture is made to the desired percent conversion of the acid or ester groups, it is transported from the esterification zone or reactors to the polycondensation zone. The commencement of the polycondensation reaction is generally marked by either a higher actual operating temperature than the operating temperature in the esterification zone, or a marked reduction in pressure (usually sub-atmospheric) compared to the esterification zone, or both. Typical polycondensation reactions occur at temperatures ranging from about 260° C. to 300° C., and at sub-atmospheric pressure of about 350 mmHg to 0.2 mm Hg. The residence time of the reactants typically ranges from about 2 to about 6 hours. In the polycondensation reaction, a significant amount of glycol is evolved by the condensation of the oligomeric ester species and during the course of molecular weight build-up.

In some processes, polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape. Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

The temperature applied to the polymer melt or of the polymer melt in at least a portion of the polycondensation zone is greater than 280° and up to about 290° C. Temperatures in the finishing zone may be, contrary to conventional practice, lower than 280° C. in order to avoid rapid increases in the rate of AA precursor formation. The pressure in the finishing zone may be within the range of about 0.2 to 20 mm Hg, or 0.2 to 10 mm Hg, or 0.2 to 2 mm Hg.

The alkaline earth metal or alkali compounds may, if desired, be added to the esterification zone before, during, or after completion of esterification, or between the esterification zone and polycondensation zone, or at a point when polycondensation starts. In one aspect, the alkaline earth metal or alkali compounds are added before 50% conversion of the esterification reaction mixture. For example, the alkaline earth metal or alkali may be added between the esterification zone and inception of or during polycondensation or at the inception or during prepolymerization. Since the alkali metal or alkaline earth metal or alkali operates as part of the polycondensation catalyst system, it is desirable to add the alkali metal or alkaline earth metal or alkali compound to the polyester melt early in the polycondensation reaction to provide the benefit of shorter reaction time or a higher molecular weight build-up.

In the polymerization process, the polyester melt is formed by polycondensing the oligomer mixture in the presence of an aluminum compound. An aluminum compound may be added late to the esterification zone, to the oligomer mixture exiting the esterification zone, or at the start of polycondensation, or to the polyester melt during polycondensation, and preferably as noted above after at least about 75% conversion in the esterification zone. However, since aluminum operates as part of the polycondensation catalyst system, it is desirable to add aluminum to the polyester melt early in the polycondensation reaction to provide the benefit of shorter reaction time or a higher molecular weight build-up. An aluminum compound is added preferably when the percent conversion of the acid end groups is at least 75%, more preferably when the % conversion of the acid end groups is at least 85%, and most preferably when the % conversion of the acid end groups from esterification is at least 93%.

An aluminum compound may be added to the oligomer mixture upon or after completion of esterification or to a polyester melt no later than when the It.V. of the melt reaches about 0.3 dL/g, or no later than when the It.V. of the melt reaches 0.2 dL/g, and more preferably to the oligomer mixture exiting the esterification zone or prior to commencing or at the start of polycondensation.

When the phosphorus compound is added to a melt phase polymerization process, the catalyst stabilizer is added to the polyester melt late during the course of polycondensation and before solidification. The deactivator is added to the polyester melt late in the course of the polycondensation reaction when one or more of the following conditions are satisfied or thereafter and before solidification of the polyester melt:
  a) the polyester melt reaches an It.V. of at least 0.50 dL/g or
  b) vacuum applied to the polyester melt, if any, is released, at least partially, or
  c) if the polyester melt is present in a melt phase polymerization process, adding the phosphorus compound within a final reactor for making the polyester polymer, near its discharge point, or between the final reactor and before a cutter for cutting the polyester melt, or
  d) if the polyester melt is present in a melt phase polymerization process, following at least 85% of the time for polycondensing the polyester melt; or
  e) the It.V. of the polyester melt is within +/−0.15 dl/g of the It.V. obtained upon solidification; or
  f) at a point within 30 minutes or less, or 20 minutes or less of solidifying the polyester melt.

The deactivator may be added to the polyester melt after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g, and most preferably, regardless of when the deactivator is added, the resulting polymer exiting the melt phase manufacture has an It.V. of at least 0.68 dL/g or at least 0.72 dL/g or at least 0.76 dL/g.

The deactivator may be added to the polyester melt when the It.V. of the polyester melt is within 0.15 dL/g, or within 0.10 dL/g, or within 0.05 dl/g, or within 0.030 dL/g, or within 0.02 of the It.V. obtained upon solidification. For example, the polyester melt could have an It.V. that is 0.10 dL/g below the It.V. obtained upon solidification, or it could have an It.V. that is 0.10 dL/g above the It.V. obtained upon solidification.

The deactivator may be added to the polyester melt at a point within 30 minutes or less, within 20 minutes or less, or within 10 minutes or less, or 5 minutes or less, or 3 minutes or less of solidifying the polyester melt. The solidification of the polyester melt typically occurs when the melt is forced through a die plate into a water bath and cut into pellets, or in a melt-to-mold process when the melt is injection molded into a molded article. In the broadest sense, solidification occurs when the temperature of the polymer melt is cooled below the crystalline melting temperature of the polymer.

The reaction time of the melt from an It.V. of 0.40 dL/g through and up to an It.V. in the range of at least 0.68 dL/g to about 0.94 dL/g is preferably 240 minutes or less, 210 minutes or less, 180 minutes or less, 150 minutes or less, or 120 minutes or less, or 90 minutes or less, or 50 minutes or less. During the times stated, the vacuum applied is preferably between 0.5 and 1.0 mm Hg, the temperature is preferably between 275° C. to 295° C. The target It.V. is preferably between 0.82 and 0.92 dL/g prior to deactivation/stabilization.

Once the polymer molecular weight is built to the desired degree, it is discharged from the final polycondensation reactor, in this case a finisher, to be pelletized. A gear pump may be utilized to facilitate funneling an amount of bulk polymer through a conduit to exit from the finishing vessel. Prior to cutting the molten polymer, and in another aspect, prior to exiting the melt phase final reactor, it may be desirable to combine the bulk polymer in the melt phase with a second stream that is a liquid (which includes a molten stream, dispersions, emulsions, homogeneous liquids, and heterogeneous slurries). The second stream can be introduced into the melt phase process at any stage prior to solidification, but preferably between the cutter and the entry into the final bulk polymer reactor (such as a finisher). The second stream may be introduced after the last half of the residence time within the final reactor and before the cutter.

The manner in which the second liquid stream is introduced and the source of the second liquid stream is not limited. For example, it may it may be desirable to treat and additionally process a portion of a slip stream. Once treated, the treated portion of a slip stream may be circulated back to the finishing tank. In another example, it may be desirable to introduce a slip stream (second liquid stream) into the finisher through an extruder or a pumping means from a source independent from or other than the bulk polymer produced in the melt phase process.

The catalyst deactivator may be added into a slip stream taken from the stream exiting the final polycondensation reactor and recirculated back into the final reactor or at a point before the slipstream is taken from the melt phase stream exiting the final reactor. In addition, other compounds such as colorants, reheat additives, or other additives can be added into a slipstream depending upon the fitness for use requirements of the polymer in its ultimate application. Any one or a mixture of these additives may be contained in the second liquid stream.

Crystallized polymers that are catalyzed by aluminum/alkaline earth metal or alkali metal systems tend to be brighter or have higher L* color values relative to crystallized polymers catalyzed by antimony systems under the same polymerization conditions. Moreover, the late addition of a phosphorus compound to polyester melts catalyzed by aluminum/alkaline earth metal or alkali metal systems produces polymers which when crystallized have even higher L* color values or higher brightness relative to the no phosphorus case, which may have somewhat higher It.V. For example, the crystallized polyester polymers obtained by the process of the invention have an L* of at least 55, or at least 60, or at least, 65, or at least 70.

Once the desired It.V. is obtained, the molten polyester polymer in the melt phase reactors may be discharged as a melt phase product and solidified.

The melt phase product is processed to a desired form, such as amorphous particles; however, crystallized pellets are preferred. The shape of the polyester polymer particles is not limited, and can include regular or irregular shaped discrete particles without limitation on their dimensions, including stars, spheres, spheroids, globoids, cylindrically shaped pellets, conventional pellets, pastilles, and any other shape, but particles are distinguished from a sheet, film, preforms, strands or fibers.

The method for solidifying the polyester polymer from the melt phase process is not limited. For example, molten polyester polymer from the melt phase process may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyester polymer is one which is crystallizable. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater and then immediately fed to a thermal crystallizer without cooling the bulk temperature of the polymer pellet below its $T_g$. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized.

Other components may also be added to the polymer blends of the present invention to enhance the performance properties of the polyester polymers. For example, crystallization aids, impact modifiers, surface lubricants, denesting agents, antioxidants, catalyst deactivators, colorants, nucleating agents, acetaldehyde reducing compounds, other reheat rate enhancing aids, and fillers and the like may be included. The polymer may also contain small amounts of branching agents such as trifunctional or tetrafunctional comonomers such as trimellitic anhydride, trimethylol propane, pyromellitic dianhydride, pentaerythritol, and other polyester forming polyacids or diols generally known in the art. All of these additives and many others and their use are well known in the art and do not require extensive discussion. Any of these compounds can be used in the present composition.

Examples of reheat additives (a reheat additive is deemed a compound added to the melt in contrast to forming a reheat aid in situ) include activated carbon, carbon black, antimony metal, tin, titanium nitride, titanium, copper, silver, gold, palladium, platinum, black iron oxide, and the like, as well as near infrared absorbing dyes, including, but not limited to those disclosed in U.S. Pat. No. 6,197,851 which is incorporated herein by reference.

Titanium nitride particles may be added as a reheat additive at any point during polymerization of the polyester polymers, or afterward, including to the esterification zone, to the polycondensation zone comprised of the prepolymer zone and the finishing zone, to or prior to the pelletizing zone, and at any point between or among these zones. The titanium nitride particles may also be added to solid-stated pellets as they are exiting the solid-stating reactor. Furthermore, the titanium nitride particles may be added to the polyester polymers in combination with other feeds to an extruder used to fabricated the polyester polymers into film, or may be fed separately to the extruder. For clarification, the particles may be added in the melt phase or to the extruder without solidifying and isolating the polyester polymer into pellets. The particles may also be added at any point in a subsequent process for making the polymer blends. In each instance at a point of addition, the particles can be added as a powder neat, or in a liquid, or a polymer concentrate, and can be added to virgin or recycled PET, or added as a polymer concentrate using virgin or recycled PET as the polyester polymers carrier.

The titanium nitride particles may have an average particle size, for example, from about 1 nm to about 1,000 nm, or from 1 nm to 300 nm, or from 1 nm to 100 nm, or from 5 nm to 30 nm, and may be present in the polymer blends of the invention in amounts, for example, from about 0.5 ppm to about 1,000 ppm, or from 1 ppm to 200, or from 1 ppm to 50 ppm.

The polymer blends of the present invention also comprise an impact modifier comprising one or more polyolefin-based homopolymer, copolymer, or higher order polymers (e.g., terpolymers) further comprising at least about 30 mole percent ethylene residues, propylene residues or a mixture thereof. Optionally, up to 90% by weight of this impact modifier may consist of preformed rubber particles together with the one or more polyolefin-based homopolymer, copolymer, or higher order polymers (hereafter sometimes referred to as "polyolefin polymers"). The impact modifier may be formed from a single polyolefin polymer, and/or blends of one or more polyolefin polymers.

Both branched and straight chain polyolefin polymers may be useful as impact modifiers in the inventive polymer blends and may be represented by the formula $$A_a\text{-}B_b\text{-}C_c\text{-}D_d\text{-}E_e\text{-}F_f\text{-}G_g$$

wherein
- A represents residues derived from ethylene, propylene or a mixture of ethylene and propylene;
- B represents carbon monoxide;
- C represents residues derived from an unsaturated monomer selected from α,β-ethylenically unsaturated carboxylic acids having from 3 to 8 carbon atoms and derivatives there of selected from monoesters of alcohols having 1 to 30 carbon atoms and dicarboxylic acids and anhydrides of dicarboxylic acids and metal salts of monocarboxylic, dicarboxylic and monoesters of dicarboxylic acids having from 0 to 100 percent of the carboxylic acid groups ionized by neutralization with metal ions and dicarboxylic acids and monoesters of dicarboxylic acids neutralized by amine-ended caprolactam oligomers having a degree of polymerization of 6 to 24;
- D represents residues derived from an ethylenically unsaturated epoxide containing 4 to 11 carbon atoms;
- E represents residues derived from an ethylenically unsaturated monomer selected from acrylate esters having 4 to 22 carbon atoms, vinyl esters of acids having from 1 to 20 carbon atoms, vinyl ethers having 3 to 20 carbon atoms, vinyl and vinylidene halides, and nitriles having from 3 to 6 carbon atoms;
- F represents residues derived from an ethylenically unsaturated monomer having pendant hydrocarbon chains of 2 to 12 carbon atoms capable of being grafted with monomers having at least one reactive group of the type defined in C and D, and pendant aromatic groups which may have 1 to 6 substituent groups having a total of 14 carbon atoms;

G represents residues derived from an ethylenically unsaturated monomer selected from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C and D;

and a=30 to 100 mole percent, b=0 to 30 mole percent, c=0 to 50 mole percent, d=0 to 50 mole percent, e=0 to 0 to 50 mole percent, f=0 to 30 mole percent, and g=0 to 30 mole percent; wherein residues A, B, C, D, E, F and G may be present in any order and the impact modifier component contains at least 30 mole percent ethylene residues, propylene residues or a mixture thereof.

Examples of the α,β-ethylenically unsaturated carboxylic acids and alkyl esters of α,β-ethylenically unsaturated carboxylic acids represented by C include acrylic, methacrylic and ethacrylic acids and alkyl esters thereof wherein the alkyl radical contains from 1 to 20 carbon atoms. Examples of ethylenically unsaturated dicarboxylic acids and metal salts of the monocarboxylic, dicarboxylic acids and the monoester of the dicarboxylic acid and neutralized derivatives thereof include, maleic acid, maleic anhydride, maleic acid monoethyl ester, metal salts of maleic acid monoethyl ester, fumaric acid, fumaric acid monoethyl ester, itaconic acid, vinyl benzoic acid, vinyl phthalic acid, metal salts of fumaric acid monoalkyl) ester, monoalkyl esters of maleic, fumaric, itaconic acids wherein the alkyl group contains from 1 to 20 carbon atoms. The carboxyl groups of such acids may be neutralized by amine-ended caprolactam oligomers having a degree of polymerization of 6 to 24. Examples of the vinyl ethers, vinyl esters, vinyl and vinylidene halides and ethylenically unsaturated alkylnitriles include vinyl alkyl ethers wherein the alkyl group contains 1 to 20 carbon atoms, vinyl benzoate, vinyl naphthoate, vinyl chloride, vinylidene fluoride, and acrylonitrile. Examples of the unsaturated epoxides having 4 to 11 carbon atoms include glycidyl methacrylate, glycidyl acrylate, allyl glycidyl ether, vinyl glycidyl ether, glycidyl itaconate, 3,4-epoxy-1-butene, and the like. Illustrative examples of monomers from which residues F may be obtained are styrene, isobutylene, vinyl naphthalene, vinyl pyridine, vinyl pyrrolidone, mono-, di-, and tri-chlorostyrene, R'-styrene where R' is 1 to 10 carbon atoms, butene, octene, decene, etc., and the like. Illustrative examples of monomers from which residues G may be obtained include butadiene, hexadiene, norbornadiene, isoprene, divinyl, allyl styrene, and the like.

The impact modifier preferably comprises about 0.5 to about 20 weight percent of epoxy-containing residues derived from monomers selected from glycidyl methacrylate, glycidyl acrylate, allyl gycidyl ether, 3,4-epoxy-1-butene, or a mixture of any two or more of such monomers. These epoxy-containing monomers may be introduced into the one or more polyolefin polymers during polymerization, or they may be subsequently grafted onto the one or more polyolefins. Such epoxy-containing, impact modifiers are well-known in the art and are available from a plurality of manufacturers.

The one or more polyolefin polymers may be modified with monomers containing a functional epoxy group include, but are not restricted to, polyethylene; polypropylene; polybutene; ethylene based copolymers and terpolymers containing vinyl acetate, alkyl acrylate, alkyl methacrylate where the alkyl group could be methyl, ethyl, butyl or ethylhexyl; ethylene-propylene copolymers (EPR); ethylene-propylene-diene (EPDM); natural rubber; polybutadiene; polyisoprene; acrylonitrile-butadiene (nitrile rubber); styrene-butadiene (SBR); styrene-butadiene-styrene (SBS); styrene-ethylene-butene-styrene (SEBS); acrylonitrile-butadiene-styrene (ABS); methyl methacrylate-butyl acrylate (acrylic core-shell); methyl methacrylate-butadiene-styrene (MBS core-shell); or combinations thereof. Of these materials, those based on polyethylene are preferred.

A useful group of epoxy-containing polyolefin polymers have, for example, the respective general formulas E/Y and E/X/Y wherein:

X represents residues derived from

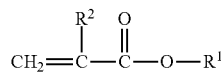

wherein $R^1$ is alkyl of up to about 8 carbon atoms, or an alkyl of 1 to 4 carbon atoms, and $R^2$ is hydrogen, methyl or ethyl, and X constitutes about 10 to 40 weight percent, or 15 to 35 weight percent, or 20 to 35 weight percent, of copolymer E/X/Y;

Y represents residues derived from, for example, glycidyl methacrylate, glycidyl acrylate, allyl glycidyl ether and 3,4-epoxy-1-butene which constitute about 0.5 to about 20 weight percent, or from 2 to 10 weight percent, of copolymer E/Y or E/X/Y; and E represents ethylene residues that constitute the remainder of the composition.

The impact modifier may also comprise a blend or mixture of one or more EN, E/X, or E/X/Y polyolefin polymers, and optionally, a polyethylene or polypropylene polymer. Thus, when we say that the impact modifier of the inventive polymer blends comprise residues of one or more monomers, not all of the one or more polyolefin polymers need contain such residues, nor need the impact modifier contain more than one polyolefin copolymer, since a single copolymer may contain all of the residues described. Similarly, when we say that the impact modifier comprises monomer residues, such monomer residues may be provided in a single polyolefin polymer or in multiple polyolefin polymers, which polyolefin polymer may or may not be the same polyolefin polymers as those containing any other residues described.

In one aspect, the polyolefin polymers containing ethylene-glycidyl methacrylate (GMA) (E/GMA) in an amount from about 2 to about 10 weight percent GMA residues are suitable for impact modifiers of the present invention. In another aspect, polyolefin polymers based on ethylene-methyl acrylate-GMA, ethylene-ethyl acrylate-GMA or ethylene-butyl acrylate-GMA containing about 20 to about 35 weight percent alkyl acrylate residues and about 2 to about 10 weight percent GMA residues are suitable for impact modifiers of the present invention. In another aspect, the concentration of the epoxy-containing impact modifiers in the polymer blends of the present invention may be, for example, from about 2 to about 30 weight percent or from 3 to 15 weight percent, or from 5 to 12 weight percent, based on the total weight of the impact modifying component. In still another aspect, the concentration of the epoxy-containing impact modifiers in the polymer blends of the present invention may be, for example, from about 15 to about 35 weight percent or from 20 to 33 weight percent, or from 25 to 30 weight percent, based on the total weight of the polymer blend. For example, polymer blends containing higher loadings of impact modifier may be suitable for use as impact modifier concentrates as describe elsewhere herein.

In another aspect, up to about 90% of one or more impact modifiers may consist of preformed elastomeric particles such as a core-shell rubber. This core-shell impact modifier may consist of:

(A) a core-shell polymer comprising, for example, from about 25 to about 95 wt. % of a first elastomeric phase polymerized from a monomer system comprising, for example, from about 75 to about 99.8% by weight $C_1$ to $C_5$ alkyl acrylate, from about 0.1 to about 5% by weight crosslinking monomer, and from about 0.1 to about 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about from about 75 to about 5 weight percent of a final, rigid thermoplastic phase polymerized in the presence of said elastomeric phase. This final layer may contain chemical species that react with the one or more PET homopolymers or copolymers of the present invention to improve adhesion to the polyester polymer; and (B) a butadiene based core-shell polymer formed between a butadiene polymer where butadiene units account for at least 50 mole percent of the total polymer and at least one vinyl monomer.

These preformed particles may be of either unimodal or multimodal size distribution. One example of an impact modifier of the core-shell type useful in the present invention is available from Rohm and Haas under the tradename Paraloid EXL-5375. Similar preformed rubber particles or mixtures of various types of preformed particles may also be used.

The one or more impact modifiers may be added using procedures well known in the art, such as compounding extrusion, either fed from a separate stream, or precompounded with other additives described in this invention.

In one aspect, an impact modifier concentrate in a PET homopolymer or copolymer may be made and let down into an extruder or injection molding machine at a desired rate to yield the desired amount of impact modifier in the polymer blend of the invention. The impact modifier concentrate would thus contain the impact modifier higher concentration than that desired in the polymer blend, which may be in the form of a container. Thus, the impact modifier of the polymer blends of the invention may be provided as a concentrate, in which the impact modifier may be present in the impact modifier concentrate in an amount, for example, of at least about 10.0 wt %, or at least 15.0 wt. %, or at least 20 wt. %, or up to about 30 wt. %, in each case based on the total weight of the impact modifier concentrate. The remainder of the impact modifier concentrate may comprise, for example, a polyester polymers or another thermoplastic polymer compatible with the inventive polymer blends (e.g., the one or more PET homopolymers or copolymers of the inventive blend).

The polymer blends of the invention may be prepared by a variety of methods. In one aspect, PET homopolymer or copolymer and the one or more impact modifiers may be separately dried in an atmosphere of dried air or dried nitrogen, fed to a to produce a molten polymer blend, and the molten polymer blend processed into a finished article (e.g., extruded though the die of a film or sheet extrusion line). In another aspect, the one or more impact modifiers are fed to the melt processing zone such that the molten polymer blend contains impact modifier in an amount, for example, up to 20 wt %, or up to 25 wt %, or up to about 30 wt %, based on the total weight of the polymer blend, and is withdrawn thought a rod die and pelletized for use as an impact modifier concentrate. The impact modifier concentrate and one or more PET homopolymers or copolymers may then be dried and introduced into a melt processing zone to produce a molten polymer blend of the invention with the desired level of impact modifier, and processed into a finished article. In still another aspect, the one or more impact modifier or impact modifier concentrate may be introduced directly into the molten PET homopolymers or copolymers during polymerization, to produce the polymer blend of the invention.

Thus, the polymer blends of the invention may be prepared by any suitable process, including those yet to be invented, perhaps the simplest being by melt-extrusion. In such a process, either alone or in combination with a fabrication step, at least a portion of the one or more PET homopolymers or copolymers may be fed into an extruder. For example, the one or more impact modifiers or impact modifier concentrate may be separately conveyed to the extruder and introduced into the extruder mixing zone. The residence time may be, for example, from about 1 to about 5 minutes at a temperature range, for example, from about 250° C. to about 310° C. In another aspect, the one or more impact modifiers or impact modifier concentrate may be introduced into the extruder and the rate of introduction adjusted to provide the amount of impact modifier necessary to achieve the desired toughness in articles produced from the inventive polymer blend. In still another aspect, the one or more impact modifiers may be introduced into the extruder at a rate to provide the desired amount of impact modifier to produce the impact modifier concentrate. The impact modifier concentrate may subsequently be introduced into the extruder with one or more PET homopolymers or copolymers to produce the inventive polymer blends.

A typical range for the one or more impact modifiers in such impact modifier concentrates may be, for example, from about 10 wt. % to about 40 wt. %, or from 15 wt. % to 33 wt. %, or from 20 wt. % to 30 wt. %, in each case based on the total weight of the impact modifier concentrate. The impact modifier concentrate may be introduced into the one or more polyester homopolymers or copolymers to provide a polymer blend with an impact modifier loading of, for example, at least about 2 wt. %, or at least 4 wt. %, or at least 6 wt. %, or up to 10 wt %, or up to 12 wt %, or up to about 15 wt. %, in each case based on the total weight of the inventive polymer blends of the application.

In one aspect, at least a portion of the polyester polymer employed in the invention is melt blended with the one or more impact modifiers so as to form impact modifier concentrates comprising predominantly the polyester polymer employed in the invention. The impact modifier concentrate may be melt blended with additional polyester polymers to provide sufficient impact modifier to polymer blend to impart the needed toughness in articles produced from the polymer blend.

In another aspect, the polyester polymers may be melt blended with the one or more impact modifiers to produce the inventive polymer blends, for example by feeding the one or more impact modifiers directly into a secondary fabrication machine, such as a film extrusion extruder.

In yet another aspect, the polyester polymers may be blended with the one or more impact modifiers to produce the inventive polymer blends, for example, by feeding the impact modifiers directly into the polymerization reactor that produces the one or more PET homopolymers or copolymers.

The one or more impact modifier may be added to the polymerization reactor, either neat or as a concentrate, at locations including, but not limited to, at the commencement of the esterification, proximate the outlet of an esterification reactor (i.e., where there is greater than 50% conversion), proximate the inlet to a prepolymer reactor, proximate the outlet to a prepolymer reactor, at a point between the inlet and the outlet of a prepolymer reactor, proximate the inlet to a polycondensation reactor, or at a point between the inlet and the outlet of a polycondensation reactor, or at a point between the outlet of a polycondensation reactor and a die for forming pellets, sheets, fibers, bottle preforms, or the like.

In still another aspect, the one or more impact modifiers may be introduced, either neat or as a concentrate, into the final polycondensation reactor producing the one or more PET homopolymers or copolymers near the end of the polymerization process, for example at any of the following points:

a. if the polyester melt is present in a melt phase polymerization process, adding the one or more polyolefin polymers within a final reactor for making the polyester polymer, near its discharge point, or between the final reactor and before a cutter for cutting the polyester melt; or b. after the It.V. of the polymer has risen to at least 0.5 dL/g, or c. after vacuum applied to the polyester melt, if any, is released, at least partially; or d. if the polyester melt is present in a melt phase polymerization process, following at least 75% of the polycondensation time;

e. to the polyester melt in the melt phase process at a point within +/−0.15 dL/g, of the It.V. obtained upon solidification; or f. at a point at most 30 minutes before solidifying the melt, or at most 20 minutes before solidifying the melt.

In one aspect, the impact modifier may be added to the polyester melt, either neat or as a concentrate, after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g. When a melt-phase-only process is used to prepare the polyester, the polymer exiting the melt phase manufacture typically has an It.V. of at least 0.68 dL/g, or at least 0.72 dL/g, or at least 0.76 dL/g.

In another aspect, impact modifier may be added, either neat or as a concentrate, to the polyester melt during or after releasing the vacuum from the polyester melt undergoing polycondensation reactions, or after bringing the pressure in a polycondensation zone or reactor from a lower level of 10 mm Hg or less or from a lower level of 3 mm Hg or less to a level of 300 mm Hg or greater, or 450 mm Hg or greater, or 600 mm Hg or greater, or to atmospheric pressure or greater, and preferably before the polyester melt is solidified.

In another aspect, the impact modifier may be added, either neat or as a concentrate, at a location near or at the end of a final reactor or between the final reactor and before a cutter. For example, the impact modifier may be added to the last polycondensation reactor at a location proximal to the outlet of the last polycondensation reactor, or to a pipe connecting directly or indirectly the last polycondensation reactor and a gear pump or extruder providing the motive force to drive the melt through a die plate for cutting wherein said pipe is directed back to or proximal to the outlet or the bottom of the last polycondensation reactor, or to a pipe inlet to the last polycondensation reactor that is proximal to its outlet.

By proximal to the outlet of the last polycondensation reactor, we mean that the addition location is within the last 25% or less of said reactor or within the last 15% or less of said reactor or preferably in the last 10% or less of said reactor. The percentage can be by length or height or volume of the last polycondensation reactor. Preferably the percentage is by length or height. The last percentages of lengths, heights or volumes are measured starting from the last polycondensation reactors outlet.

In yet another aspect, the impact modifier, either neat or as a concentrate, may added to the polyester melt following at least 85%, or at least 90%, or at least 95%, or at least 98%, or about 100% of the average polycondensation time. The average polycondensation time is a measure of the average time elapsed between when a given portion of melt enters the start of polycondensation zone to when that given portion of melt reaches the exit of the polyester melt from the last polycondensation reactor. The average polycondensation time or average residence time in the polycondensation zone can be measured by tracer studies or modeling.

In a further aspect, the impact modifier, either neat or as a concentrate, may be added to the polyester melt when the It.V. of the polyester melt is within 0.15 dL/g, or within 0.10 dL/g, or within 0.05 dl/g, or within 0.030 dL/g, or within 0.02 of the It.V. obtained upon solidification. For example, the polyester melt could have an It.V. that is 0.10 dL/g below the It.V. obtained upon solidification, or it could have an It.V. that is 0.10 dL/g above the It.V. obtained upon solidification.

In yet another aspect, the impact modifier may be added, either neat or as a concentrate, to the polyester melt at a point within 30 minutes or less, within 20 minutes or less, or within 10 minutes or less, or 5 minutes or less, or 3 minutes or less, of solidifying the polyester melt. The solidification of the polyester melt typically occurs when the melt is forced through a die plate into a water bath and cut into pellets, or in a melt-to-mold process when the melt is injection molded into a molded article. In the broadest sense, solidification occurs when the temperature of the polymer melt is cooled below the crystalline melting temperature of the polymer.

When a portion of the one or more PET homopolymers or copolymers is blended with the impact modifier so as to form such concentrates, the amount of impact modifier in such impact modifier concentrates may vary, for example, from about 5 wt. % to about 40 wt. %, or from 10 wt. % to 35 wt. %, or from 15 wt. % to 30 wt. %, in each case based on the total weight of the polymer blend. These concentrates may then be further blended with additional amounts of one or more PET homopolymers or copolymers to obtain the amounts of impact modifier ultimately present in the polyester compositions of the invention. The impact modifier and their amounts are as further described elsewhere herein.

The total amount of the impact modifier in the inventive polyesters compositions of the invention may vary widely, and will depend in part on the low temperature toughness desired for the particular application. Typically, the total amount of impact modifier in the polymer blends of the invention may be, for example, from about 2 to about 20 wt. %, or from 3 wt % to about 15 wt %, or from 5 wt % to 14 wt %, in each case based on the total weight of the polyester polymers and the impact modifier. In choosing the amount of desired impact modifier, consideration is given to a number of factors such as article design (e.g., tray design), minimum use temperature requirements for the specific article, type and composition of the impact modifier (e.g., concentration of GMA in the one or more polyolefin polymers), and impact modifier costs, which influence the amount of impact modifier used.

In general, suitable amounts of impact for food tray applications ranges from about 2.0 wt. %, or from 4 wt. %, up to about 16 wt. %, or up to 13 wt. %, or up to 10 wt. %. Accordingly, in another aspect, the amount of impact modifier ranges from about 2.0 wt. %, or from 4 wt. %, up to about 14 wt. %, or up to 12 wt. %, or up to 10 wt. %, base on the total weight of the inventive polymer blend.

Food trays comprising crystallized PET polymer blends (CPET) have good dimensional stability over the range of temperatures commonly encountered during both microwave and convection oven cooking. CPET food trays are conveniently manufactured by first extruding a film of polymer blend, then thermoforming the film (either vitrified or molten) into trays in a heated die. Two processes are in use for the thermoforming of food trays from crystallizable polyester polymers blends, however the physiochemical properties of the polymer blends used in these processes are significantly different. In the first process, sometimes termed the "roll-fed" or "in line" process, as disclosed in U.S. Pat. No. 3,496,143, the thermoforming process both forms the shape of the tray and crystallizes the polymer blend film, which is supplied as a vitrified (amorphous) film. polyester polymer obtained from the melt is amorphous, and development of significant crystallinity is necessary to obtain the desired physical properties. In this first process, an amorphous film (a.k.a., amorphous sheet) of polymer blend is heated, and then supplied to a heated mold, for example a mold formed between two heated platens. The hot film may be made to conform to the heated mold by, for example, application of a vacuum. Crystallization is then accomplished by holding the thermoformed, polyester film at a temperature between its glass transition temperature, $T_g$, and its crystalline melt temperature, $T_m$, for a sufficient amount of time by maintaining the thermoformed film in contact with the heated mold. Crystallization of the film in its net shape produces the desired high temperature stability of the thermoformed article, and allows its removal from the mold without damage. A desired level of crystallinity is, for example, at least about 20%, or at least 24%, or at least 28%, or at least 32%, or up to about 34%. Thus, in this first process, the polyester film is heated from below its glass transition temperature to a temperature range in which crystallization can occur.

In the second the thermoforming processes, a film of molten polymer blend is extruded and the molten polymer blend is thermoformed into an article by drawing the molten film into a mold before complete vitrification of the film of molten polymer blend. As with the former process, the film is drawn into the mold cavity by, for example, application of a vacuum and maintained in contact with the heated mold until the article exhibits at least 20%, or at least 24%, or at least 28%, or at least 32%, or up to about 34% crystallinity. This process is termed the melt-to-mold process. In contrast to the roll-fed process where the polyester film is heated from below its $T_g$, in the melt-to-mold process, the molten polyester film is at or above its $T_g$. Thus, the crystallization process is completely different, and it has been found, in general, that crystallization nucleators eminently suitable for the roll-fed process are ill-suited for the melt-to-mold process. The differences in crystallization due to the thermal history of the polyester is discussed by D. W. van Krevelen, CHIMIA, 32 (1978), p. 279, where large differences in nucleation density are observed with differences in thermal history, i.e. depending upon whether the polymer is heated from below the glass transition temperature or cooled from the melt to the crystallization temperature.

Unmodified, crystallizable polyesters such as polyethylene terephthalate (PET) crystallize slowly when cooled from the melt or heated from below the glass transition temperature. To obtain acceptable manufacturing economics, it is necessary that the rate of thermal crystallization in the mold be rapid.

The crystallization rate of PET and other polyesters has been increased through the use of additives. A well-known method to increase the rate of crystallization is to incorporate a crystallization nucleator into the polyester. These crystallization rate enhancers typically are inorganic or organic solids finely dispersed throughout the polyester. Examples of inorganic nucleators include talc, $TiO_2$, carbon black, and zeolites, while examples of organic nucleators include polyolefins such as low density polyethylene, high density polyethylene, polypropylene, polybutene, and polymethyl pentene. A more extensive list of optional nucleators are disclosed in U.S. Pat. No. 7,015,267 incorporated herein by reference. Such nucleators typically are used at a concentration, relative to the polyester being nucleated, in amounts of about 0.01 wt % to about 5 wt %. The great majority of prior art that attempts to increase the crystallization rate of polyester articles is concerned with crystallization during cooling of the polymer, especially in injection molding processes. One characteristic of many crystallization nucleators well-known in the art, such as talc, is that they promote crystallization during cooling from the melt as well as during heating from below the glass transition temperature. These types of nucleators may be suited for the second process discussed above (i.e., a melt-to-mold process) where the extruded molten film is formed into the shape of an article and crystallized before the molten film is cooled to a temperature below the $T_g$ of the molten polymer blend comprising the molten film.

US Application 20050261463 (incorporated herein by reference in its entirety) discloses crystallizable polyester compositions containing an aliphatic polyamide crystallization nucleator exhibiting controllable and adjustable crystallization rates upon cooling from the melt and are suitable in melt-to-mold processes. Nucleators disclose include but are not limited to polybutyleneadipamide, polyhexyleneadipamide, polyoctyleneadipamide, polycaprolactam, polyamide-11, polyamide-12, and other aliphatic polyamides which are conceptually the condensation product of a C4-12 alkylenediamine and a C4-12 dicarboxylic acid, or of an aminocarboxylic acid or cyclic lactam. While the polyamide may also contain a minor portion of aromatic residues, these should be less than 20 mol percent based on the total amount of all residues present, more preferably less than 10 mol percent, and yet more preferably less than 5 mol percent. Most preferably, aromatic residues are absent.

If however, the object is to produce an amorphous part, such as an extruded vitrified film as is the case for the first process (i.e., the roll-feed process), crystallization from the melt is objectionable because it may interfere with subsequent operations, such as thermoforming. The best nucleation additives for processes that require crystallization on heating the vitrified film from below the glass transition temperature, as in the case as described for a roll-feed process, ideally have little or no enhancement (or even suppression) of crystallization rate when cooling from the melt. Polyethylene, is often used in roll-feed operations, however, U.S. Pat. No. 6,986,864 (incorporated herein by reference in its entirety) discloses polyester compositions comprising a thermoplastic polyester, an impact modifier and a polyester crystallization rate enhancing component selected from poly(tetramethylene terephthalate) homo- and co-polymers. The polyester compositions exhibit improved crystallization rates as compared to similar compositions not including impact modifier or compositions using other types of crystallization rate enhancing components such as polyolefin-based polymers The polymer blends provided by the present invention also may contain one or more additives to improve thermal stability. The presence of one or more additives to improve thermal stability may be desirable when either the polymer blend or tray produced therefrom will experience high temperatures for a significant period of time during processing or in use. Such heat stabilizers typically function through the inhibition of oxidation during exposure to an oxidizing atmosphere at high temperatures. Various types of heat stabilizers may be employed with the most useful for the present invention including alkylated substituted phenols, bisphenols, thiobisacrylates, aromatic amines, organic phosphites, and polyphosphites. Specific aromatic amines which demonstrate heat stabilizing capabilities include primary polyamines, diarylamines, bisdiarylamines, alkylated diarylamines, ketone diarylamine condensation products, and aldehyde imines.

One example of a thermal stabilizer useful in this invention is Irganox 1010 antioxidant (Ciba-Geigy Corporation) which is believed to be a hindered polyphenol stabilizer comprising tetrakis-[methylene 3-(3,5-di tert-butyl-4-hydroxyphenyl-propionate)]methane. Another thermal stabilizer that may be used is 1,3,5-trimethyl-2,4,6-tris(3,5-di-t-butyl-4-hydroxybenzyl)benzene. Yet another example is the PEP-Q additive available from Sandoz Chemical, the primary ingredient of which is believed to be tetrakis-(2,4-di-tert-butyl-phenyl)-4,4'biphenyl phosphonite. Other common stabilizer additives include calcium stearate or zinc stearate. Still other stabilizers commonly used include Ultranox 626 antioxidant (General Electric), the primary ingredient of which is believed to be bis(2,4-di-t-butylphenyl)pentaerythritol diphosphite, and Ultranox 627A antioxidant believed to be Ultranox 626 containing about 7 weight percent of a magnesium aluminum hydrocarbonate. Those persons skilled in the art may easily determine the amount of stabilizer that should be added to improve the thermal stability. This amount typically is about 0.001 to about 5 parts per hundred parts by weight of the polyester polymer comprising the polymer blend.

The novel polymer blends also may contain one or more additives which suppress transesterification reactions between the one or more polyester polymers. Such transesterification-inhibiting additives commonly are employed for blends of polyesters or copolyesters and polycarbonates, such as is described in U.S. Pat. No. 4,088,709. Blend stabilizers differ in their ability to control blend melt stability and transesterification. Effective stabilizers for polyester/polyester as well as polyester/polycarbonate blends are known in the art and are commercially available. Suitable phosphorus-based transesterification inhibitors that may be present in the polymer blends of the present invention include, but are not limited, to the following phosphorus compounds:

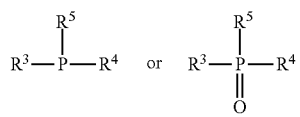

wherein each of $R^3$, $R^4$, and $R^5$ represents a hydrogen atom, an alkyl group containing 1 to 20 carbon atoms, an aryl group containing 6 to 20 carbon atoms, an aralkyl group containing 7 to 20 carbon atoms, or an OR group in which R is a hydrogen atom, an alkyl group containing 1 to 20 carbon atoms, an aryl group containing 6 to 20 carbon atoms, and aralkyl group containing 7 to 20 carbon atoms; $R^3$, $R^4$, and $R^5$ may be different from each other, or at least two of $R^3$, $R^4$, and $R^5$ may be the same, or at least two of $R^3$, $R^4$, and $R^5$ may form a ring, and metal salts of these phosphorous compounds.

Other transesterification inhibitors that may be present include compounds having the structures:

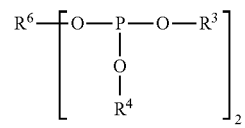

wherein $R^6$ represents a divalent alkyl group having 2-12 carbon atoms or a divalent aryl group having 6-15 carbon atoms; $R^3$ and $R^4$ are monovalent alkyl groups having 2-18 carbon atoms, or a monovalent aryl or substituted aryl group having 6 to 15 carbons;

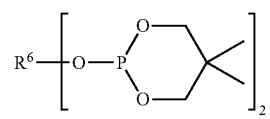

wherein $R^6$ represents a divalent alkyl or poly(alkylene oxide) groups having 2-12 carbon atoms or a divalent aryl or substituted aryl group having 6-15 carbon atoms.

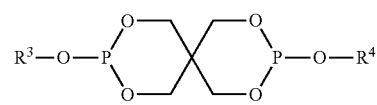

wherein $R^3$ and $R^4$ represent monovalent alkyl groups having 2-18 carbon atoms, or a monovalent aryl or substituted aryl groups having 6-15 carbon atoms.

These phosphorus-containing transesterification inhibitors typically are used in concentrations of about 0.01 to 3 weight percent based on the total weight of the polymer blend. These stabilizers may be used alone or in combination and may be added to either the polyester polymer or to the impact modifier before or during the process of forming the polymer blends of this invention. The suitability of a particular compound for use as a polymer blend stabilizer and the determination of how much is to be used as a polymer blend stabilizer may be readily determined by preparing a polymer blend and determining the effect on crystallization rate.

Other additives normally used in polyesters such as pigments, colorants, plasticizers, flame retardants, mold release agents, slip agents and the like may be optionally included as desired. Some of these additives may speed crystallization of the polymer blends from the melt. Glass fibers or other inorganic fillers may also be included.

In one aspect, the inventive polymer blends contains less than 60 wt %, or less than 40 wt %, or less than 20 wt. %, or less than 10 wt. %, or less than 5 wt. %, or no post-consumer recycled polyester polymer ("PCR") present in the composition, based on the total weight of all polyester polymers. In another aspect, the composition contains PCR in an amount of greater than zero and up to 60 wt. %, or up to 40 wt. %, or up to 20 wt %, or up to 10 wt. %, based on the total weight of all polyester polymers.

In still another aspect, the inventive polymer blends may contain recycled inventive polymer blends obtained from the film from which trays were thermoformed and cut. The recycled inventive blends may be added to the polymer blends of the invention in an amount of up to about 60 wt. %, or up to 40 wt. %, or up to 20 wt %, or up to 10 wt. %, based on the total weight of all polymer blends. In another aspect, the inventive polymer blends may contain recycled inventive polymer blends in an amount less than 60 wt %, or less than 40 wt %, or less than 20 wt. %, or less than 10 wt. %, or less than 5 wt. %, or no recycled inventive polymer blend is present in the composition, based on the total weight of all polyester polymers. In still another aspect, the inventive polymer blends, especially when intended to be used as impact modifier concentrates, may contain recycled inventive polymer blends in an amount sufficient to provide 100 wt % of the polyester polymer to the inventive blend.

The polymer blends of this invention can be prepared by conventional compounding technology, such as the use of single or twin screw extruders. The resultant blends are readily extruded into film or sheet or injection molded, compression molded or thermoformed into desired shapes or objects.

Another aspect of the present invention pertains to novel shaped articles, especially food trays, fabricated from the inventive polymer blends Food trays prepared from the inventive blends possess good low temperature toughness to resist breakage from accidental falls during storage or transportation. The trays also retain reasonable strength and dimensional stability over a range of temperatures from −34° C. to about 230° C.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Effect of Polyester Polymer Type on Polymer Blend Toughness

Polyester Polymer A (PET-A) was a PET homopolymer containing residues of terephthalic acid and ethylene glycol. The polymer contained about 250 ppm Sb and 25 ppm P, provided as a catalyst system. PET-A was prepared by melt polymerizing the dicarboxylic acids and diol residues in the presence of the antimony and phosphorus catalysts to an intrinsic viscosity of about 0.72 dL/g, after which the molten PET was then solidified, palletized, and solid-statepolymerized to an intrinsic viscosity of 0.95 dL/g.

Polyester Polymer B (PET-B) was a PET copolymer containing residues of terephthalic acid, ethylene glycol, and isophthalic acid, with isophthalic acid residues representing about 2.5 mole % of the dicarboxylic acid residues. The polymer contained about 250 ppm Sb and 25 ppm P, provided as a catalyst system catalyst. PET-B was prepared by melt polymerizing the dicarboxylic acids and diol residues in the presence of the antimony and phosphorus catalysts to an intrinsic viscosity of about 0.66 dL/g, after which the molten PET was then solidified, palletized, and solid-state polymerized to an intrinsic viscosity of 0.84 dL/g.

Polyester Polymer C (PET-C) was a PET copolymer containing residues of terephthalic acid, ethylene glycol, and isophthalic acid, with isophthalic acid residues representing about 2.9 mole % of the dicarboxylic acid residues. The polymer contained about 12 ppm Al, about 9 ppm Li, and about 55 ppm phosphorus, provided as a catalyst system; and included a reheat additive and red and blue toners. PET-C was prepared by melt polymerizing the dicarboxylic acids and diol residues in the presence of the aluminum and lithium catalysts, reheat additive, and toners to an intrinsic viscosity of about 0.82 dL/g, after which the phosphorus was added and the molten PET was then pelletized and solidified.

The PET polymers also contained low levels (less than 5 mol %) of DEG residues, present as a natural byproduct of the melt polymerization process, or intentionally added as a modifier, for example to control the amount of DEG present in the final polymer.

Impact Modifier: was a 25/75 wt %/wt % blend of a random copolymer of ethylene and 28% methyl acrylate having a melt index (ASTM D-1238) of 7 g/10 minutes (LOTRYL 28MA07 from Arkema) and a random terpolymer of ethylene, 23.5% methyl acrylate and 7.25% glycidyl methacrylate having a melt index (ASTM D-1238) of 6.5 g/10 minutes (LOTADER AX8900 from Arkema).

Nucleator: was a poly(tetramethylene/polyoxytetramethylene terephthalate) copolyetherester from DuPont—Hytrel 5556

Comparative Polymer Blend 1 (i.e., Run 10), Comparative Polymer Blend 2 (i.e., Run 11), and Polymer Blend 3 (i.e., Run 12), were prepared by combining the above components as presented in Table 1.

TABLE 1

Experiment 1 Compositions of Multiple Passes to Produce Polymer Blends 1 through 3 (Runs 10, 11, and 12, respectively):

| Day | Run | Wt % PET A (Virgin) | Wt % PET A (Regrind) | Wt % PET B (Virgin) | Wt % PET B (Regrind) | Wt % PET C (Virgin) | Wt % PET C (Regrind) | Wt % Nucleator | Wt % Impact Modifier | Film Thickness (Polished) |
|---|---|---|---|---|---|---|---|---|---|---|
| 1 | 1 | 89 | | | | | | 1 | 10 | 22 mil |
| 1 | 2 | | | 89 | | | | 1 | 10 | 22 mil |
| 1 | 3 | | | | | 89 | | 1 | 10 | 22 mil |
| 2 | 4 | 44.5 | 50 (from day 1) | | | | | 0.5 | 5 | 22 mil |
| 2 | 5 | | | 44.5 | 50 (from day 1) | | | 0.5 | 5 | 22 mil |
| 2 | 6 | | | | | 44.5 | 50 (from day 1) | 0.5 | 5 | 22 mil |
| 3 | 7 | 44.5 | 50 (from day 2) | | | | | 0.5 | 5 | 22 mil |
| 3 | 8 | | | 44.5 | 50 (from day 2) | | | 0.5 | 5 | 22 mil |
| 3 | 9 | | | | | 44.5 | 50 (from day 2) | 0.5 | 5 | 22 mil |

TABLE 1-continued

Experiment 1 Compositions of Multiple Passes to Produce
Polymer Blends 1 through 3 (Runs 10, 11, and 12, respectively):

| Day | Run | Wt % PET A (Virgin) | Wt % PET A (Regrind) | Wt % PET B (Virgin) | Wt % PET B (Regrind) | Wt % PET C (Virgin) | Wt % PET C (Regrind) | Wt % Nucleator | Wt % Impact Modifier | Film Thickness (Polished) |
|---|---|---|---|---|---|---|---|---|---|---|
| 4 | 10 | 44.5 | 50 (from day 3) | | | | | 0.5 | 5 | 22 mil |
| 4 | 11 | | | 44.5 | 50 (from day 3) | | | 0.5 | 5 | 22 mil |
| 4 | 12 | | | | | 44.5 | 50 (from day 3) | 0.5 | 5 | 22 mil |
| 5 | 13 | 44.5 | 50 (from day 4) | | | | | 0.5 | 5 | 22 mil |
| 5 | 14 | | | 44.5 | 50 (from day 4) | | | 0.5 | 5 | 22 mil |
| 5 | 15 | | | | | 44.5 | 50 (from day 4) | 0.5 | 5 | 22 mil |

Polymer blends were prepared by combining their respective components as defined in Table 1 above, melt blending the components and extruding the molten polymer blends into films, after which the films were heated to a temperature about 150° C., thermoformed into trays, and held in the heated tray mold until the thermoformed films achieved about 28% crystallinity. Test samples were then cut from the bottom of trays thermoformed from each polymer blend.

Extrusion Protocol:

PET is a hygroscopic material and as a result, its intrinsic viscosity decreases as a function of the amount of water absorbed. Initially, PET polymer was placed in a drying hopper at 150° C. for 8 hours with an air flow of 1 standard cubic foot per minute; the impact modifier was dried at 40° C. for 8 hours with an air flow of 1 standard cubic foot per minute, and the nucleator was dried at 120° C. for 8 hours with an air flow of 1 standard cubic foot per minute. In subsequent extrusion passes, regrind (i.e., edge trim cut from prior extruded film along with excess film remaining after the thermoformed trays were cut from the film) was dried at 150° C. for 8 hours with an air flow of 1 standard cubic foot per minute. Prior to combining the individual components, the dryer temperatures were reduced to 65° C. In the process of the present invention, the dried PET polymer, impact modifier, nucleator, and regrind for passes 2 through 5 were weighed and pre-blended using a Maguire blender (Model: WSB-140R) mounted to the feed hopper of a Davis-Standard 2" single screw extruder (Model: Mark V) and introduced into the feed throat of the extruder, melt blended, and extruded through a film die to form a vitreous film. Attached to the end of the extruder was a die for extruding thermoplastic film. The extruder and film die conditions are given in Table 2:

TABLE 2

Standard-Davis Extrusion Conditions

Extruder RPMs: 80
Extruder Zones 1-4 Temperatures:
575° F., 595° F., 540° F., 540° F.
Extruder-to-Die Adapter Temp 540° F.
Screen Changer Temperature: 540° F.
Screen Packs: 24 mesh-60 mesh-24 mesh
Feed Blocks: 530° F.
Die Zone 1: 520° F.
Die Zone 2: 515° F.
Die Zone 3: 520° F.

The extruded film in the form of a molten polymer blend was quenched or cooled to solidify the molten film using a 3-chill roll vertical stack (Davis-Standard Model: EX-M-PLAR Sheet System) with the film nipped between the top and middle rolls and the film wrapping around the middle and bottom rolls. The extruded molten polymer blend is to be brought into contact with the chill roll stack so that no orientation or substantially no orientation is induced in the final film and there is a thermally induced average crystallinity in the finished film of less than about 10% and preferably less than about 5%. The run conditions of the respective rolls are presented in Table 3. The 3-roll stack was positioned relatively close to the extruder die, the distance being dependent on factors such as the temperature of the rolls, the film extrusion rate, the film thickness, and the roll speed. Generally, the distance from the die to the roll is about 0.25 to 5 cm.

TABLE 3

3-Stack Roll Conditions

Top Roll Temperature: 110° F.
Middle Roll Temperature: 110° F.
Bottom Roll Temperature: 110° F.
Roll Gap 0.0230 in
Roll Pressure: 2000 psi
Line Speed: 7.4 ft/min
Top Roll Speed: 7.4 ft/min
Middle Roll Speed: 7.4 ft/min
Bottom Roll Speed: 7.4 ft/min
Target Film Guage: 22 mil Thermoforming Protocol: The vitrified film was thermoformed on a Hydrotrim Model:1620 using a 6" by 11" aluminum rectangular mold with a ¾" draw. Film was heated to approximately 150° C. and crystallized in a mold having a surface temperature of about 163° C. for 12 to 15 seconds.

The temperature of the mold was monitored by means of a thermocouple which was fastened within the aluminum block in which the mold is mounted. The mold surface temperature was monitored and controlled by a digital temperature controller. The relationship between the mold and frame was such that when the mold was moved into contact with the PET film held in the frame, a seal was formed between the heated film and the mold. A vacuum system was attached to the mold. The vacuum system achieved a vacuum of about 25 in Hg.

The low temperature toughness of the Polymer Blends were evaluated using a modified testing protocol based on ASTM D1790-02 (i.e., "Standard Test Method for Brittleness Temperature of Plastic Sheeting by Impact). This modified test method offers a quantitative measure of the temperature at which a sample cut from the bottom of trays formed from each respective polymer blends transitions from a ductile failure mode to a brittle failure mode. With the modified sheet brittleness test, the crystallized thermoformed tray is exposed to incremental decreases in temperature thereby inducing the tray to traverse a temperature wherein the tray no longer fails in a ductile (i.e., tough) manner and begins to fail in a brittle behavior. The temperature at which 50% tray samples exhibit brittle failure is reported as the ductile-to-brittle transition temperature (DBTT).

Ductile-to-Brittle Impact Test: Test specimens 2" by 5¾" were cut from the bottom of thermoformed trays. At room temperature, the two ends of each specimen were collected together forming a gradual, closed loop. The collected ends of the specimen were stacked on the narrow end of a 2" by 5" card so that the body of the loop lay on the card. (The 2" by 5" card was cut from an index card.) The end of the loop was attached to the end of the card via two staples ½" from, and parallel to, the 2" end of the stack.

For each sample, five specimens were prepared as described and inserted into a refrigerated test chamber with the impact testing apparatus. (The test chamber had previously been allowed to stabilize for 20 minutes at the desired test temperature.) After 15 minutes each of the five test specimens were place individually on the anvil of the impact test equipment with the crimped end of the staples on the back of the card fitted into the groove of the anvil. In this manner, the sample loop of film is centered on the anvil with the loop facing away from the pivotal end of the impact arm. The impact arm is then allowed to free fall from the vertical onto the looped sample which is resting on the anvil. The samples are then removed and examined for failure. Partial fracture is construed as failure as well as complete division into two or more pieces.

The temperature of the test chamber was then lowered by 5° C., allowed to stabilize for 20 minutes, and another group of five specimens placed in the chamber for 15 minutes. The testing procedure and examination were repeated as described above. A range of temperatures are tested in 5° C. increments to include temperatures where all modes are ductile and a lower temperature where all failure modes are brittle. The number of breaks by brittle failure (out of 5 specimens) was recorded. The "% failure" versus "temperature data was analyzed using a non-linear logistic regression model and the temperature at which the regression model predicted 50% of the samples would fail was recorded at the ductile to brittle transition temperature (DBTT). Therefore, the brittleness temperature was defined as the temperature at which the non-linear logistic regression model predicts 50% of the samples tested would fail in a brittle mode.

Impact Modifier Loading: The wt % impact modifier for the polymer blends was determined by hydrolysis (with base) of polymer blends, followed by filtration. The filter was weighed to determine the mass of the non-PET component (i.e., the impact modifier), which was compared to the total mass of polymer blend sample hydrolyzed.

Intrinsic Viscosity: The intrinsic viscosity (It.V.) values described throughout this description are set forth in dL/g unit as calculated from the inherent viscosity (Ih.V.) measured at 25° C. in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50 g/100 ml)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0} \ln(\eta_r/C)$$

where $\eta_{int}$=Intrinsic viscosity
$\eta_r$=Relative viscosity=ts/to
$\eta_{sp}$=Specific viscosity=$\eta_r - 1$ Instrument calibration involves replicate testing of a standard reference material and then applying appropriate mathematical equations to produce the "accepted" I.V. values.

$$\text{Calibration Factor} = \frac{\text{Accepted } Ih.V. \text{ of Reference Material}}{\text{Average of Triplicate Determinations}}$$

$$\text{Corrected } IhV = \text{Calculated } IhV \times \text{Calibration Factor}$$

The intrinsic viscosity (It.V. or $\eta_{int}$) may be estimated using the Billmeyer equation as follows:

$$\eta_{int} = 0.5[e^{0.5 \times \text{Corrected } Ih.V.} - 1] + (0.75 \times \text{Corrected Ih.V.})$$

The reported intrinsic viscosities are calculated based on the weight of polymer blend dissolved in the phenol/tetrachlorethane solvent and are not corrected for the relative proportion of impact modifier contained in the respective polymer blends.

Percent Crystallinity: Film crystallinity is determined using Differential Scanning Calorimetry (DSC). The sample weight for this measurement is 10±1 mg. The first heating scan was performed. The sample was heated from approximately 25° C. to 290° C. at a rate of 20° C./minute, and the absolute value of the area of the melting endotherms (one or more) minus the area of any crystallization exotherms is determined. This area corresponds to the net heat of melting and is expressed in Joules. The heat of melting of 100% crystalline PET was taken to be 119 Joules/gram, so the weight percent crystallinity of the sample is calculated as the net heat of melting divided by the quantity 119 times the weight percent of one or more polyester polymers in the polymer blend (i.e., the 119 J/g is adjusted to reflect the amount of crystallizable polyester polymer in the polymer blend), and then multiplied by 100. Unless otherwise stated, the initial melting point in each case was also determined using the same DSC scan.

Film thicknesses: Reported film thicknesses are the average of 20 measurements.

The intrinsic viscosity (uncorrected for the non-PET component) for the Polymer Blend A through C and their respective antecedents following each of the multiple extrusion passes are shown in Table 1.

For example, for Polymer Blend 1:
Pass 1 for Polymer Blend 1 is Run 1 in Table 1,
Pass 2 for Polymer Blend 1 is Run 4,
Pass 3 for Polymer Blend 1 is Run 7,
Pass 4 for Polymer Blend 1 is Run 10,
Pass 5 for Polymer Blend 1 is Run 13,
For Polymer Blend 2:
Pass 1 for Polymer Blend 2 is Run 2,
Pass 2 for Polymer Blend 2 is Run 5,
Etc.

TABLE 4

Intrinsic Viscosities (Uncorrected) for Polymer Blends 1 through 3 and the antecedent extrusion passes.

|  | Comparative Polymer Blend 1 | Comparative Polymer Blend 2 | Polymer Blend 3 |
| --- | --- | --- | --- |
| Virgin | 0.95 | 0.84 | 0.82 |
| Pass 1 | 0.831 | 0.755 | 0.781 |
| Pass 2 | 0.769 | 0.697 | 0.726 |
| Pass 3 | 0.753 | 0.657 | 0.691 |
| Pass 4 | 0.719 | 0.644 | 0.669 |
| Pass 5 | 0.762 | 0.675 | 0.721 |

The increase in intrinsic viscosity from pass 4 to pass 5 was unexpected and indicative of errors in the preparation of the polymer blends. Therefore, film for the 4th pass extrusion was thermoformed into trays for testing. Test specimens were cut from the center of the tray for testing.

TABLE 5

Film Properties of Samples Cut from Thermoformed Trays Comprising Polymer Blends 1 through 3.

|  |  | Avg. Thickness (mm) | Avg. Thickness MILs | 50% Failure Temperature C. ° | % Crystallinity by DSC | Wt % Impact Modifier by Hydrolysis |
| --- | --- | --- | --- | --- | --- | --- |
| Comparative Polymer Blend 1 | 4th pass (Run 10) | 0.502 | 19.7 | −25 | 30.4 | 10.82 |
| Comparative Polymer Blend 2 | 4th pass (Run 11) | 0.509 | 20.04 | −18 | 27.9 | 10.75 |
| Polymer Blend 3 | 4th pass (Run 12) | 0.524 | 20.8 | −28 | 30.6 | 11.18 |

TABLE 6

Failure Frequency versus Temperature for Samples Cut from Thermoformed Trays Comprising Polymer Blends 1 through 3.

|  | Comparative Polymer Blend 1 | | Comparative Polymer Blend 2 | | Polymer Blend 3 | |
| --- | --- | --- | --- | --- | --- | --- |
| Temp | # of Breaks | # of Specimens | # of Breaks | # of Specimens | # of Breaks | # of Specimens |
| −10° C. | 0 | 5 | 1 | 5 | 0 | 5 |
| −15° C. |  |  | 1 | 5 |  |  |
| −20° C. | 0 | 5 | 4 | 5 | 0 | 5 |
| −25° C. | 2 | 5 | 4 | 5 | 0 | 5 |
| −30° C. | 5 | 5 | 5 | 5 | 4 | 5 |
| −35° C. |  |  |  |  | 5 | 5 |

Additional samples from trays previously thermoformed for Comparative Polymer Blends 1 and 2, and Polymer Blend 3 were tested for ductile-to-brittle transition temperature:

TABLE 7

Repeat Analysis of Film Properties of Additional Samples Cut from Thermoformed Trays Comprising Polymer Blends 1 through 3.

|  |  | Avg. Thickness (mm) | Avg. Thickness MILs | 50% Failure Temperature C. ° |
| --- | --- | --- | --- | --- |
| Comparative Polymer Blend 1 | 4th pass (Run 10) | 0.501 | 19.9 | −29 |
| Comparative Polymer Blend 2 | 4th pass (Run 11) | 0.516 |  | −18 |
| Polymer Blend 3 | 4th pass (Run 12) | 0.525 | 21.3 | −28 |

TABLE 8

Repeat Analysis of Failure Frequency versus Temperature for Additional Samples Cut from Thermoformed Trays Comprising Polymer Blends 1 through 3.

|  | Comparative Polymer Blend 1 | | Comparative Polymer Blend 2 | | Polymer Blend 3 | |
| --- | --- | --- | --- | --- | --- | --- |
| Temp | # of Breaks | # of Specimens | # of Breaks | # of Specimens | # of Breaks | # of Specimens |
| −10° C. |  |  |  |  |  |  |
| −15° C. |  |  | 1 | 5 |  |  |
| −20° C. | 0 | 5 | 4 | 5 | 1 | 5 |
| −25° C. | 0 | 5 | 5 | 5 | 2 | 5 |
| −30° C. | 3 | 5 |  |  | 4 | 5 |
| −35° C. | 5 | 5 |  |  | 5 | 5 |

Surprisingly, CPET trays prepared from Polymer Blend 3 comprising PET-C had a lower (i.e., better) ductile-to-brittle transition temperature than those prepared from PET-B, notwithstanding that the starting IV of the PET-C was lower than that of PET-B. Especially surprising, samples cut from CPET trays comprising PET-C (i.e., Polymer Blend 3) performed as well as those prepared from the higher It.V. PET-A.

Example 2

Affect of PET Polymers Phosphorus Loading on Polymer Blend Toughness

Polyester Polymer A (PET-A) was the same as previously described in Example 1

Polyester Polymer B (PET-B) was the same as previously described in Example 1

Polyester Polymer C (PET-C) was the same as previously described in Example 1

Polyester Polymer D (PET-D) was a PET copolymer containing residues of terephthalic acid, ethylene glycol, and isophthalic acid, with isophthalic acid residues representing about 2.9 mole % of the dicarboxylic acid residues. The polymer contained about 12 ppm Al, about 9 ppm Li, and about 25 ppm phosphorus, provided as a catalyst system; and included a reheat additive and red and blue toners. PET-D was prepared by melt polymerizing the dicarboxylic acids and diol residues in the presence of the aluminum and lithium catalysts, reheat additive, and toners to an intrinsic viscosity of about 0.82 dL/g, after which the phosphorus was added and the molten PET was then pelletized and solidified.

The PET polymers also contained low levels (less than 5 mol %) of DEG residues, present as a natural byproduct of the melt polymerization process, or intentionally added as a modifier, for example to control the amount of DEG present in the final polymer.

Impact Modifier: was the same as previously described in Example 1.

Nucleator: was the same as previously described in Example 1.

Comparative Polymer Blend 4 (i.e., Run 28), Comparative Polymer Blend 5 (i.e., Run 29), Polymer Blend 7 (i.e., Run 30), and Polymer Blend 7 (i.e., Run 31), were prepared by combining the above components as presented in Table 9.

Polymer blends of Example 2 were prepared as described above in Example 1 by combining their respective components as defined in Table 5 above. Runs 28 through 31 were thermoformed for testing and correspond the Polymer Blends 4 through 7, respectively.

Polymer Blends 4 through 7 of Example 2 were thermoformed into trays and tested for low temperature toughness using the DBTT protocol as described above in Example 1.

Intrinsic Viscosity (It.V.): ItV data (uncorrected for the non-PET component) following each of the multiple extrusion passes for the polymer blends and their antecedents were as follows:

TABLE 10

Intrinsic Viscosities (Uncorrected) for Polymer Blends 4 through 7 and the antecedent extrusion passes.

|  | Comparative Polymer Blend 4 | Comparative Polymer Blend 5 | Polymer Blend 6 | Polymer Blend 7 |
| --- | --- | --- | --- | --- |
| Virgin | 0.939 | 0.818 | 0.819 | 0.791 |
| Pass 1 | 0.818 | 0.733 | 0.755 | 0.739 |
| Pass 2 | 0.759 | 0.689 | 0.724 | 0.698 |
| Pass 3 | 0.753 | 0.672 | 0.720 | 0.697 |
| Pass 4 | 0.764 | 0.688 | 0.720 | 0.705 |

Film from the 4$^{th}$ extrusion pass was thermoformed into trays. Specimens were cut from the center of the trays for testing.

TABLE 9

Experiment 2 Polymer Blend Compositions:

| Day | Run | Wt % PET A (Virgin) | Wt % PET A (Regrind) | Wt % PET B (Virgin) | Wt % PET B (Regrind) | Wt % PET C (Virgin) | Wt % PET C (Regrind) | Wt % PET D (Virgin) | Wt % PET D (Regrind) | Wt % Nucleator | Wt % Impact Modifier | Thickness (Polished) |
| --- | --- | --- | --- | --- | --- | --- | --- | --- | --- | --- | --- | --- |
| 1 | 16 | 89 | | | | | | | | 1 | 10 | 22 mil |
| 1 | 17 | | | 89 | | | | | | 1 | 10 | 22 mil |
| 1 | 18 | | | | | 89 | | | | 1 | 10 | 22 mil |
| 1 | 19 | | | | | | | 89 | | 1 | 10 | 22 mil |
| 2 | 20 | 44.5 | 50 (from day 1) | | | | | | | 0.5 | 5 | 22 mil |
| 2 | 21 | | | 44.5 | 50 (from day 1) | | | | | 0.5 | 5 | 22 mil |
| 2 | 22 | | | | | 44.5 | 50 (from day 1) | | | 0.5 | 5 | 22 mil |
| 2 | 23 | | | | | | | 44.5 | 50 (from day 1) | 0.5 | 5 | 22 mil |
| 3 | 24 | 44.5 | 50 (from day 2) | | | | | | | 0.5 | 5 | 22 mil |
| 3 | 25 | | | 44.5 | 50 (from day 2) | | | | | 0.5 | 5 | 22 mil |
| 3 | 26 | | | | | 44.5 | 50 (from day 2) | | | 0.5 | 5 | 22 mil |
| 3 | 27 | | | | | | | 44.5 | 50 (from day 2) | 0.5 | 5 | 22 mil |
| 4 | 28 | 44.5 | 50 (from day 3) | | | | | | | 0.5 | 5 | 22 mil |
| 4 | 29 | | | 44.5 | 50 (from day 3) | | | | | 0.5 | 5 | 22 mil |
| 4 | 30 | | | | | 44.5 | 50 (from day 3) | | | 0.5 | 5 | 22 mil |
| 4 | 31 | | | | | | | 44.5 | 50 (from day 3) | 0.5 | 5 | 22 mil |

Table 11: Film Properties of Samples Cut from Thermoformed Trays Comprising Polymer Blends 4 through 7.

TABLE 12

Failure Frequency versus Temperature for Samples Cut from Thermoformed Trays Comprising Polymer Blends 4 through 7.

| Temp | Comparative Polymer Blend A | | Comparative Polymer Blend B | | Polymer Blend C | | Polymer Blend D | |
|---|---|---|---|---|---|---|---|---|
| | # of Breaks | # of Specimens | # of Breaks | # of Specimens | # of Breaks | # of Specimens | # of Breaks | # of Specimens |
| −15° C. | 0 | 5 | 0 | 5 | 0 | 5 | 0 | 5 |
| −20° C. | 0 | 5 | 0 | 5 | 0 | 5 | 0 | 5 |
| −25° C. | 0 | 5 | 3 | 5 | 0 | 5 | 0 | 5 |
| −30° C. | 1 | 5 | 4 | 5 | 0 | 5 | 2 | 5 |
| −35° C. | 0 | 5 | 5 | 5 | 3 | 5 | 4 | 5 |
| −40° C. | 4 | 5 | | | 5 | 5 | 5 | 5 |
| −45° C. | 4 | 5 | | | | | | |
| −50° C. | 5 | 5 | | | | | | |

There was less IV loss during extrusion for the melt phase only resins compared to the solid-stated resins.

Trays made from the Li/Al catalyzed melt phase only PET polymers (i.e., PET C and D) exhibited less IV loss during extrusion compared to the solid-stated resins (i.e., PET A and B) and surprisingly showed lower (better) ductile-to-brittle transition temperatures than from PET B which has a comparable It.V. Furthermore, the impact performance of the trays produced from the inventive polymer blends using the melt phase only PET polymers approached that of those made from the high It.V. homopolymer 12822. Both levels of phosphorus in the melt phase only materials gave good performance.

We claim:

1. An extruded film extruded from an amorphous polymer blend comprising:
   a. an impact modifier component present in an amount of from about 2 to about 33 weight percent of one or more epoxy-containing impact modifying polymers, based on the total weight of the polymer blend, and
   b. a phthalic acid-based polymer component comprising one or more polyethylene terephthalate copolymers comprising aluminum atoms in an amount from about 3 ppm to about 60 ppm and one or more alkaline earth metal atoms, alkali metal atoms, or alkali compound residues in an amount from about 1 ppm to about 25 ppm, in each case based on the weight of the one or more polyethylene terephthalate copolymers, wherein all of the polymers of the phthalic acid-based polymer component comprise an ethylene glycol monomer unit and a phthalic acid dicarboxylic acid monomer unit including at least 95 mole % terephthalic acid and isophthalic acid,
   wherein the polymer blend does not comprise polyamide and has an intrinsic viscosity of 0.82 dL/g or less and a 50% failure ductile-to-brittle transition temperature of −28° C. or less;
   wherein the one or more polyethylene terephthalate copolymers are made without the addition of any catalytically active metal or metal compounds other than the aluminum atoms and the one or more alkaline earth metal atoms or alkali metal atoms.

2. The extruded film of claim 1 having a thickness of about 300 to about 1000 microns.

3. A thermoformed tray comprising an extruded film extruded from an amorphous polymer blend comprising:
   a. an impact modifier component present in an amount of from about 2 to about 33 weight percent of one or more epoxy-containing impact modifying polymers, based on the total weight of the polymer blend and
   b. a phthalic acid-based polymer component comprising one or more polyethylene terephthalate copolymers comprising aluminum atoms in an amount from about 3 ppm to about 60 ppm and one or more alkaline earth metal atoms, alkali metal atoms, or alkali compound residues in an amount from about 1 ppm to about 25 ppm, in each case based on the weight of the one or more polyethylene terephthalate copolymers, wherein all of the polymers of the phthalic acid-based polymer component comprises an ethylene glycol monomer unit and a phthalic acid dicarboxylic acid monomer unit including at least 95 mole % terephthalic acid and isophthalic acid,
   wherein the extruded film has a thickness of about 300 to 1000 microns;
   wherein the polyester has a crystallinity between about 20 percent and 35 percent,
   wherein the polymer blend does not comprise polyamide and has an intrinsic viscosity of 0.82 dL/g or less and a 50% failure ductile-to-brittle transition temperature of −28° C. or less;
   wherein the one or more polyethylene terephthalate copolymers are made without the addition of any catalytically active metal or metal compounds other than the aluminum atoms and the one or more alkaline earth metal atoms or alkali metal atoms.

4. A thermoformed container for packaging food extruded from an amorphous polymer blend comprising:
   a. a nucleator;
   b. an impact modifier component present in an amount of from about 2 to about 33 weight percent of one or more epoxy-containing impact modifying polymers, based on the total weight of the polymer blend; and
   c. a phthalic acid-based polymer component comprising one or more polyethylene terephthalate copolymers comprising aluminum atoms in an amount from about 3 ppm to about 60 ppm and one or more alkaline earth metal atoms, alkali metal atoms, or alkali compound residues in an amount from about 1 ppm to about 25 ppm, in each case based on the weight of the one or more polyethylene terephthalate copolymers; wherein all of the polymers of the phthalic acid-based polymer component comprises an ethylene glycol monomer unit and a phthalic acid dicarboxylic acid monomer unit including at least 95 mole % terephthalic acid and isophthalic acid, wherein the container has a thickness of about 300 to 1000 microns wherein the polyester has an intrinsic viscosity (It.V.) in the range of about 0.6 to about 1.0 dL/g and a crystallinity between about 20 percent and 35 percent, wherein the polymer blend does not comprise polyamide and has an intrinsic viscosity of 0.82 dL/g or less and a 50% failure ductile-to-brittle transition temperature of −28° C. or less;

wherein the one or more polyethylene terephthalate copolymers are made without the addition of any catalytically active metal or metal compounds other than the aluminum atoms and the one or more alkaline earth metal atoms or alkali metal atoms.

5. A thermoformed tray having a thickness ranging from 18 mil to 22 mils and having a degree of crystallinity ranging from 25% to 30% obtained from extruding an amorphous polymer blend comprising:

a. an impact modifier component present in an amount of from 4 to 14 weight % of one or more epoxy-containing impact modifying polymers, based on the total weight of the polymer blend, and b. a phthalic acid-based polymer component comprising one or more polyethylene terephthalate copolymers comprising aluminum atoms in an amount from about 3 ppm to about 60 ppm and one or more alkaline earth metal atoms, alkali metal atoms, or alkali compound residues in an amount from about 1 ppm to about 25 ppm, in each case based on the weight of the one or more polyethylene terephthalate copolymers, wherein all of the polymers of the phthalic acid-based polymer component comprises a diol monomer unit and a phthalic acid dicarboxylic acid monomer unit including at least 95 mole % terephthalic acid and isophthalic acid, wherein the diol monomer unit consists of ethylene glycol, wherein the polymer blend does not comprise polyamide and has an intrinsic viscosity of 0.82 dL/g or less and a 50% failure ductile-to-brittle transition temperature of −28° C. or less;

wherein the one or more polyethylene terephthalate homopolymers-er copolymers are made without the addition of any catalytically active metal or metal compounds other than the aluminum atoms and the one or more alkaline earth metal atoms or alkali metal atoms.

6. The thermoformed tray of claim 5, wherein the ductile-to-brittle transition temperature value is −30° C. or less.

7. The thermoformed tray of claim 5, wherein the ductile-to-brittle transition temperature value is −35° C. or less.

8. The thermoformed tray of claim 5, wherein the ductile-to-brittle transition temperature is −37° C. or less.

9. The thermoformed tray of claim 5, wherein the ductile-to-brittle transition temperature value is −40° C. or less.

10. The thermoformed tray of claim 5, wherein the impact modifier is present in an amount ranging from 5 to 12 wt. %.

11. The extruded film of claim 1, wherein the epoxy-containing impact modifying polymer is present in an amount of about 3 to about 20 weight percent;
the aluminum atoms are present in the polyethylene terephthalate copolymers in an amount of from about 5 to about 35 ppm;
the lithium atoms are present in the polyethylene terephthalate copolymers in an amount of from about 5 ppm to about 15 ppm;
phosphorous atoms are present in the polyethylene terephthalate copolymers in an amount of from about 10 ppm to about 70 ppm.

12. The thermoformed tray of claim 3, wherein the epoxy-containing impact modifying polymer is present in an amount of about 3 to about 20 weight percent;
the aluminum atoms are present in the polyethylene terephthalate copolymers in an amount of from about 5 to about 35 ppm;
the lithium atoms are present in the polyethylene terephthalate copolymers in an amount of from about 5 ppm to about 15 ppm;
phosphorous atoms are present in the polyethylene terephthalate copolymers in an amount of from about 10 ppm to about 70 ppm.

13. The thermoformed container of claim 4, wherein the epoxy-containing impact modifying polymer is present in an amount of about 3 to about 20 weight percent;
the aluminum atoms are present in the polyethylene terephthalate copolymers in an amount of from about 5 to about 35 ppm;
the lithium atoms are present in the polyethylene terephthalate copolymers in an amount of from about 5 ppm to about 15 ppm;
phosphorous atoms are present in the polyethylene terephthalate copolymers in an amount of from about 10 ppm to about 70 ppm.

14. The thermoformed tray of claim 5, wherein the epoxy-containing impact modifying polymer is present in an amount of about 3 to about 20 weight percent;
the aluminum atoms are present in the polyethylene terephthalate copolymers in an amount of from about 5 to about 35 ppm;
the lithium atoms are present in the polyethylene terephthalate copolymers in an amount of from about 5 ppm to about 15 ppm;
phosphorous atoms are present in the polyethylene terephthalate copolymers in an amount of from about 10 ppm to about 70 ppm.

15. The extruded film of claim 11, wherein the polymer blend has a color value L* of 55 to 77.31.

16. The thermoformed tray of claim 12, wherein the polymer blend has a color value L* of 55 to 77.31.

17. The thermoformed container of claim 13, wherein the polymer blend has a color value L* of 55 to 77.31.

18. The thermoformed tray of claim 14, wherein the polymer blend has a color value L* of 55 to 77.31.

19. The extruded film of claim 1, wherein the polymer blend does not comprise any poly(tetramethylene terephthalate) homo-polymers or poly(tetramethylene terephthalate) co-polymers.

20. The thermoformed tray of claim 3, wherein the polymer blend does not comprise any poly(tetramethylene terephthalate) homo-polymers or poly(tetramethylene terephthalate) co-polymers.

21. The thermoformed container of claim 4, wherein the polymer blend does not comprise any poly(tetramethylene terephthalate) homo-polymers or poly(tetramethylene terephthalate) co-polymers.

22. The thermoformed tray of claim 5, wherein the polymer blend does not comprise any poly(tetramethylene terephthalate) homo-polymers or poly(tetramethylene terephthalate) co-polymers.

23. The extruded film of claim 1, wherein the phthalic acid-based polymer component further comprises phosphorus in an amount of 25-55 ppm.

24. The thermoformed tray of claim 3, wherein the phthalic acid-based polymer component further comprises phosphorus in an amount of 25-55 ppm.

25. The thermoformed container of claim 4, wherein the phthalic acid-based polymer component further comprises phosphorus in an amount of 25-55 ppm.

26. The thermoformed tray of claim 5, wherein the phthalic acid-based polymer component further comprises phosphorus in an amount of 25-55 ppm.

27. The extruded film of claim 1, wherein the phthalic acid-based polymer component has less than 5% crystallinity.

28. The extruded film of claim 1, wherein the phthalic acid-based polymer component has less than 2% crystallinity.

29. The extruded film of claim 1, wherein the phthalic acid-based polymer component comprises about 2.9 mol % isophthalic acid.

30. The thermoformed tray according to claim 3, wherein the phthalic acid-based polymer component comprises about 2.9 mol % isophthalic acid.

31. The thermoformed container according to claim 4, wherein the phthalic acid-based polymer component comprises about 2.9 mol % isophthalic acid.

32. The thermoformed tray according to claim 5, wherein the phthalic acid-based polymer component comprises about 2.9 mol % isophthalic acid.

* * * * *